(12) United States Patent
DeCapua et al.

(10) Patent No.: US 12,400,005 B1
(45) Date of Patent: Aug. 26, 2025

(54) MANAGING SECURITY OF A SOFTWARE DEVELOPMENT LIFE CYCLE

(71) Applicant: Splunk Inc., San Francisco, CA (US)

(72) Inventors: Todd Leonard DeCapua, Wilmington, DE (US); Christopher Lance Duffey, Houston, TX (US); Neil Douglas Erkkila, Cherry Valley, MA (US); Jeremy Robert Hicks, Ellsworth, ME (US)

(73) Assignee: Splunk Inc., San Francisco, CA (US)

( * ) Notice: Subject to any disclaimer, the term of this patent is extended or adjusted under 35 U.S.C. 154(b) by 188 days.

(21) Appl. No.: 18/162,272

(22) Filed: Jan. 31, 2023

(51) Int. Cl.
*G06F 21/55* (2013.01)
*G06F 8/77* (2018.01)
*G06F 21/57* (2013.01)

(52) U.S. Cl.
CPC .............. *G06F 21/577* (2013.01); *G06F 8/77* (2013.01); *G06F 21/552* (2013.01); *G06F 2221/033* (2013.01)

(58) Field of Classification Search
CPC ........ G06F 21/577; G06F 8/77; G06F 21/552; G06F 2221/033
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2019/0018956 A1* | 1/2019 | Sadaghiani | G06N 5/01 |
| 2019/0098106 A1 | 3/2019 | Mungel et al. | |
| 2020/0112585 A1* | 4/2020 | Keohane | G06F 21/316 |
| 2021/0150013 A1* | 5/2021 | Duval | G06F 21/44 |
| 2022/0261480 A1* | 8/2022 | Youngberg | G06F 21/105 |
| 2022/0309418 A1* | 9/2022 | Chivukula | G06F 8/71 |
| 2023/0067084 A1* | 3/2023 | Mohanty | G06F 8/60 |

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.

(Continued)

*Primary Examiner* — Catherine Thiaw
*Assistant Examiner* — Daniel Elahian
(74) *Attorney, Agent, or Firm* — Kilpatrick Townsend & Stockton LLP

(57) ABSTRACT

Data are mapped from multiple tools to a common information model during the development life cycle of a software application. The common information model normalizes the data, enabling the data to be correlated even when development tasks are performed by separate entities using different tools. Using the common information model, security issues are identified in a later part of the software development life cycle based on data generated at an earlier phase, such as on an ongoing basis throughout the life cycle. A user can investigate the security issues and associated risk using an interactive dashboard.

13 Claims, 10 Drawing Sheets

(56) References Cited

OTHER PUBLICATIONS

Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

600

Collect, from a plurality of software tools used to develop a software program, data generated by the plurality of software tools during development of the software program, wherein the software program is developed in part by use of a first software tool of the plurality of software tools
602

↓

Normalize the collected data generated by the plurality of software tools to produce normalized data
604

↓

Storing the normalized data generated by the plurality of software tools persistently in a storage facility beyond a usage period of the first software tool
606

↓

Identify, after the usage period of the first software tool, a security issue associated with the software program by analyzing the normalized data generated by the plurality of software tools
608

↓

Cause display, in a graphical user interface, of an alert indicative of the security issue
610

FIG. 6

MANAGING SECURITY OF A SOFTWARE DEVELOPMENT LIFE CYCLE

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and derive other insights.

The large amount and diversity of data systems containing large amounts of structured, semi-structured, and unstructured data relevant to any search query can be massive and continues to grow rapidly. This technological evolution can give rise to various challenges in relation to managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 6 is a flowchart illustrating an example process for managing the security of an SDLC.

DETAILED DESCRIPTION

Figure 1:
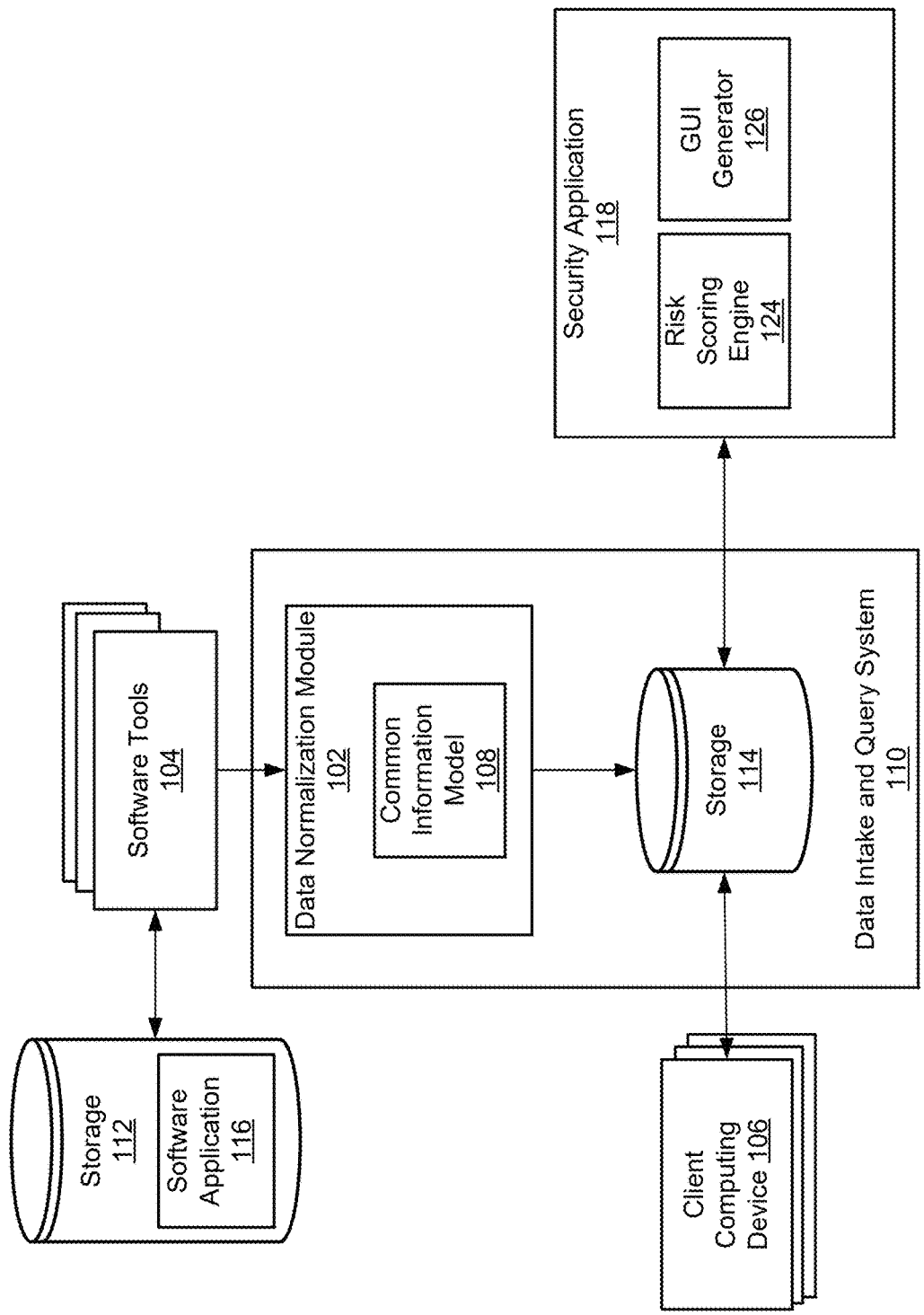
FIG. 1 illustrates an example of a data processing environment.

A software development process is typically divided into smaller steps, phases, or sub-processes to improve design and product management. This process is often referred to as the software development life cycle (SDLC). Methodologies, processes, and frameworks for the SDLC range from specific prescriptive steps that can be used directly by an organization in day-to-day work, to flexible frameworks that an organization uses to generate a custom set of steps tailored to the needs of a specific project. Example methodologies include agile, waterfall, prototyping, iterative and incremental development, spiral development, rapid application development, and extreme programming.

Different phases in a software development process generally require different sets of practices or tools. For example, different tools are needed when planning a project, building a software application (e.g., writing or committing source code), deploying code to users, and operating the product. Accordingly, each phase in the SDLC of a software program (e.g., a software application) has different sets of characteristics and concerns that can contribute to errors or security risks.

The various tools used during different development phases produce data that can be analyzed for security issues. But because of the differing characteristics and concerns between development phases, the data produced at one phase and used to analyze security issues are generally not compatible with data produced during other phases. For instance, data from different development phases can have different fields or be in different formats from each other. In addition, different tools used in software development are often produced by different entities without consideration for cross-compatibility. Because of these issues, data used to analyze security issues from earlier phases in the SDLC are generally not available to developers at later phases.

As a result, security risks that originate at an earlier phase are then easily overlooked during later phases. In addition, errors in multiple development phases can cumulatively contribute to security risk. As a result, these errors can be difficult to diagnose and cumbersome to fix. Therefore, systems and tools are needed to identify security risks in a software application throughout multiple phases of the SDLC.

DevOps is a set of practices that combines software development (Dev) and IT operations (Ops). DevOps is complementary to agile software development, and many aspects of DevOps are based on agile principles. One feature of DevOps includes continuous integration and deployment. Code changes are quickly integrated and deployed by automating many development processes with the assistance of various tools, which helps to ensure that product quality remains high. The increased pace of code changes, integration, and deployment can also result in increased risk.

DevSecOps is a next iteration of practices that leverages capabilities from software development (Dev), security (Sec), and IT operations (Ops). Like DevOps, DevSecOps employs automation to streamline development. Additionally, DevSecOps implements automated security processes to enable early and continuous security throughout the SDLC and is found in mature organizations leveraging Agile and similar practices. Thus, the ability to identify security risks across an SDLC is especially useful within the context of DevOps and DevSecOps.

Embodiments of the technology introduced herein provide systems and techniques that collect, normalize, and persist data generated by multiple software development and security tools across multiple phases of an SDLC of a software program, such as a software application. By normalizing, aggregating, and persisting data generated by multiple software development and security tools, collectively referred to as "software tools," across development phases of a software application, security risks associated with the software application can be more easily identified during the SDLC, even if the software application is developed over multiple phases using multiple software tools. As a result, insights can be derived in a later part of the life cycle based on data generated at an earlier phase. This approach contrasts with existing processes, where engineers and security teams working on different phases of software development are separate from each other and do not share data, and consequently, security risks often go undiscovered until after deployment. With the techniques introduced here, for example, security risks associated with an application across the SDLC can be cumulatively represented as a risk score, and alerts can be generated when the risk score exceeds a threshold or satisfies some other criterion. As a result, security issues can be identified earlier, improving the overall security of the software application being developed. In addition, efficiency of the development process is improved, reducing the time, cost, and computing resources needed to identify and resolve errors.

FIG. 1 shows an example of a data processing environment 100, in which the techniques introduced here can be implemented. The environment 100 includes a data normalization module 102, one or more software tools 104, and one or more client computing devices 106 (generically referred to as client device(s) 106). The software tools 104 are used during an SDLC of a software application 116, which is stored in a storage facility 112. Example software tools 104 include development tools and security tools. The data normalization module 102 can ingest data from heterogeneous data sources, such as software tools 104. Furthermore, the data normalization module 102 can index the data for storage in a storage facility 114. In some implementations, the data normalization module 102 and the storage facility 114 are part of a data intake and query system (DIQS) 110. For example, the DIQS 110 can ingest, index, and/or store any type of machine data, regardless of the form of the machine data or whether the machine data matches or is similar to other machine data ingested, indexed, and/or stored by the DIQS 110.

As part of the ingestion process, the data normalization module 102 can receive data from the software tools 104 and normalize the data using a common information model 108. The common information model 108, further discussed below, includes a set of data fields onto which data from multiple software tools 104 can be mapped, even if the data have different formats.

In some cases, the DIQS 110 can parse the received data into events, group the events, and store the events in buckets. An "event" in this context is a portion of machine data associated with a specific point in time (e.g., by a timestamp). The DIQS 110 can also search heterogeneous data that it has stored or search data stored by other systems (e.g., other DIQS systems or other non-DIQS systems). For example, in response to received queries, the DIQS 110 can assign one or more components to search events stored in the storage facility 114 or search data stored elsewhere. An example of a commercially available data intake and query system that can be used to implement the DIQS 110 is SPLUNK® ENTERPRISE, developed by Splunk Inc. of San Francisco, California.

As described in greater detail below, the DIQS 110 can include one or more components (not shown in FIG. 1) to ingest, index, store, and/or search data. In some embodiments, the DIQS 110 is implemented as a distributed system that uses multiple components to perform its various functions. For example, the DIQS 110 can include any one or any combination of an intake system (including one or more components) to ingest data, an indexing system (including one or more components) to index the data, a storage system (including one or more components) to store the data, and/or a query system (including one or more components) to search the data, etc.

The data normalization module 102 facilitates monitoring and analysis of security issues associated with the tools 104 used during an SDLC. Accordingly, the environment 100 also includes a security application 118 operatively coupled to the storage 114. The security application 118 is used at least to analyze data that has been output by the software tools 104, processed by the data normalization module 102, and stored in the storage facility 114. The security application 118 can be a software application that runs logically "on top of" or in cooperation with the DIQS 110. An example of such a network security application is SPLUNK® ENTERPRISE SECURITY, also developed by Splunk Inc. Two relevant components of the security application 118 are a risk scoring engine 124 and a graphical user interface (GUI) generator 126. In at least some embodiments, clients 106 accessing the storage facility 114 also are clients of (and therefore have access to) the security application 118.

The risk scoring engine 124 accesses the normalized data in the storage facility 114. It then analyzes the data, identifies notable events from the data, and assigns risk scores to the notable events. The risk scoring engine 124 may identify notable events and assign risk scores using any of various techniques, which may include, for example, rules, machine learning, or a combination thereof. The risk scoring engine 124 can operate in an online mode (i.e., by scoring newly received data as they are received by the data normalization module 102), in an off-line (batch) mode (i.e., by scoring indexed and stored data), or both. Based on the fields of the common information model 108, the risk scoring engine can identify entities associated with the software application, including computer users, devices (e.g., clients, servers, routers, virtual machines), applications, or a combination thereof. The GUI generator 126 provides a GUI (accessible via any of the client computing devices 106, for example) for initiating searches of risk notables and viewing results of those searches.

Figure 2:
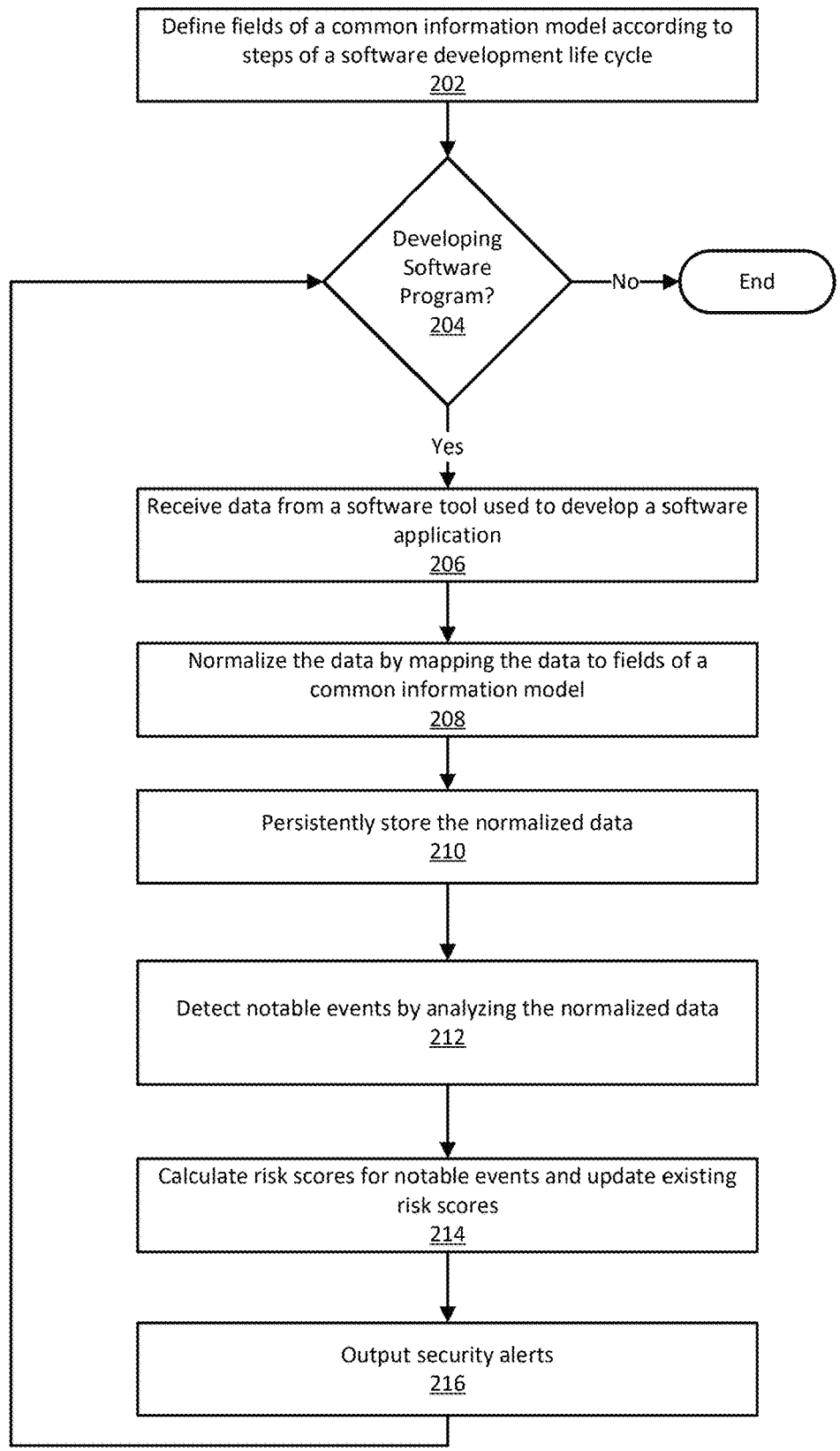
FIG. 2 illustrates an example of a process that can be performed by a data normalization module and a security application.

FIG. 2 illustrates an example of a process that can be performed by the data normalization module 102 and the security application 118. The process 200 begins by defining fields of a common information model (e.g., common information model 108) according to steps of an SDLC of a software program at step 202. For example, each step of the SDLC can involve the use of different software tools 104, and the fields of the common information model 108 can be customized based on the data output by the tools 104. The remaining steps 204-216 can be performed throughout the SDLC as long as the software program is being developed at step 204. For instance, the steps 204-216 can be performed periodically according to a specified time interval (e.g., daily), at specified days/times, or based on any other suitable or convenient time criterion or trigger.

At step 206, data is received at the data normalization module 102 from a software tool used to develop the software program. At step 208, the data is normalized by mapping the data to the fields of the common information model 108, as defined in step 202. At step 210, the normalized data is stored in a persistent storage facility 114 (e.g., hard drive, flash memory, or the like).

Once the data is stored at step 210, the security application 118 can analyze the normalized data to detect notable events at step 212. Specifically, the searches executed by the security application 118 can be configured to detect security issues by searching the data for parameters indicative of source code errors, dependencies, access by unauthorized users, and the like. At step 214, risk scores are calculated for the notable events, e.g., by the risk scoring engine 124. In addition, because the process is performed on an ongoing basis, existing risk scores (e.g., associated with prior searches) can also be updated. The detected events and risk scores can cause the security application 118 to output security alerts at step 216, which notify developers to security issues and provide useful information for analyzing and fixing these issues. Finally, the process 200 loops back to step 204 and repeats as long as the software program is still being developed at step 204. For example, the loop can continue as the SDLC progresses through different phases, as new versions of the software program are released, or on a periodic basis.

Figure 3:
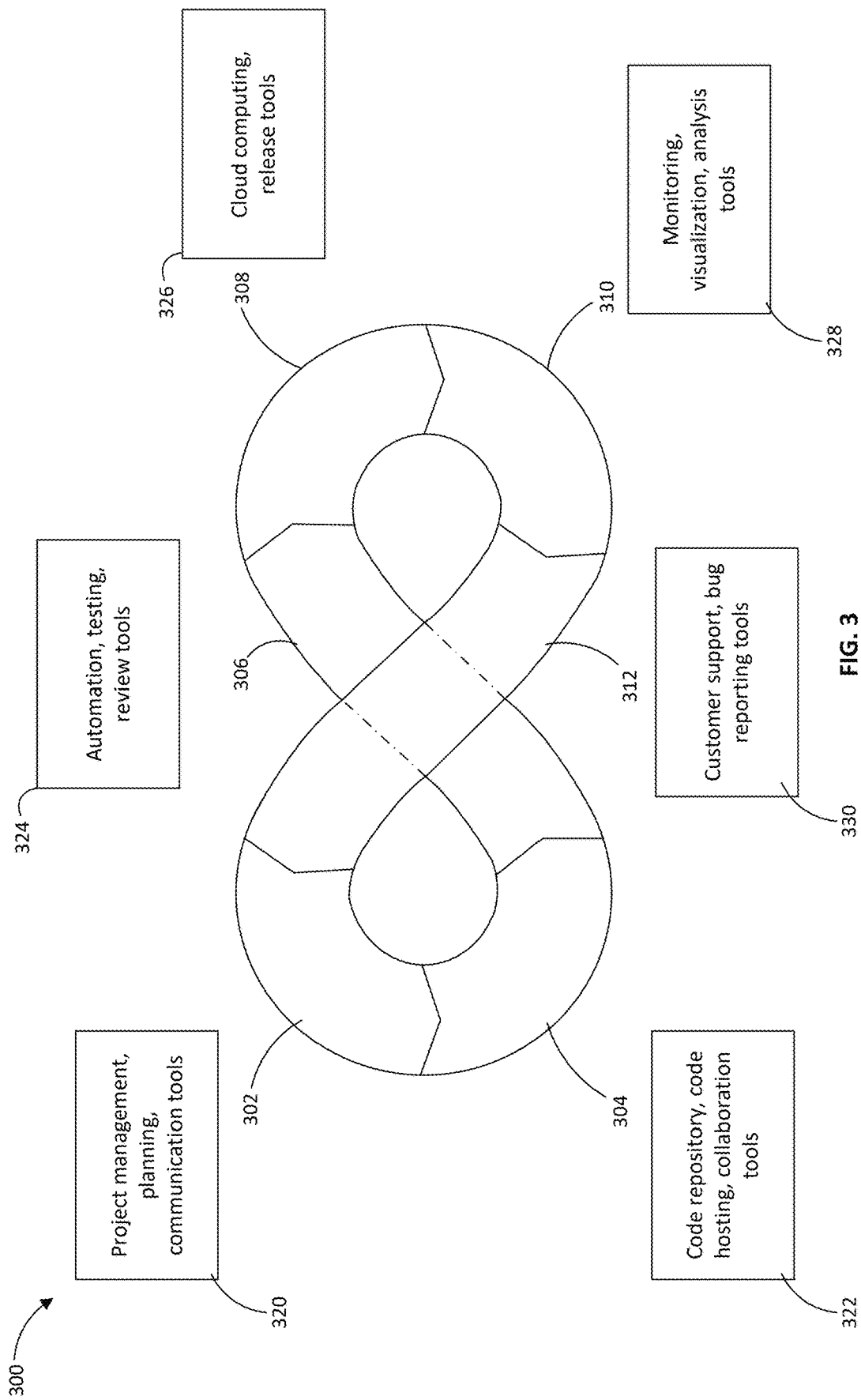
FIG. 3 illustrates an example software development life cycle (SDLC).

FIG. 3 illustrates an example SDLC 300 for a software application. The SDLC 300 shown in FIG. 3 is consistent with DevOps practices and includes a planning phase 302, a build phase 304, a continuous integration phase 306, a deployment phase 308, an operation phase 310, and a continuous feedback phase 312. The SDLC 300 also includes continuous integration phase 306 and continuous feedback phase 312, where a code base is quickly modified in response to feedback.

The phases 302-312 shown in FIG. 3 are merely for illustrative purposes. In some implementations, the illustrated phases can be sub-divided into smaller sub-phases, can occur in different orders, or the SDLC 300 can include different or additional phases. For example, the SDLC 300 can also include design, testing, maintenance, or other phases, at least some of which can be incorporated as part of the phases 302-312 shown in FIG. 3. In some implementations, the SDLC 300 includes coding or monitoring phases. A sequence of automated processes, referred to as a "pipeline," can be set up across one or more of these phases by implementing the various tools 320-330.

In general, the present technology is applicable to a wide variety of software development cycles with multiple phases, regardless of how individual phases are defined (e.g., by particular methodologies or organizational practices). Although some examples are discussed herein in relation to DevOps and DevSecOps, other development and security practices can also be used, such as agile, waterfall, prototyping, iterative and incremental development, spiral development, rapid application development, extreme programming, security frameworks, etc.

Each phase of the SDLC 300 is associated with different types of software tools 320-330 being used to create the software application. For example, project management tools, planning tools, or communications tools 320, such as text editors, messaging applications, or video conferencing tools, can be used in the planning phase 302 to record project plans and outline initial goals. Subsequently, code hosting or collaboration tools 322 (e.g., GitHub®) can be used during the build phase 304. In some implementations, a software tool is used in more than one phase. For example, automation tools 324 (e.g., Jenkins®) or cloud computing tools 326 can be used to test and deploy the software during the continuous integration phase 306 and the deployment phase 308. Monitoring and analysis tools 328 can be used during the operation phase 310. Feedback data, for example in the form of support tickets from customer support tools 330, is provided in the continuous feedback phase 312. Other software tools besides the types of tools 320-330 shown in FIG. 3 can also be used, for example depending on the development process or particular software application being developed. In addition, the tools 320-330 are not necessarily restricted for use in the same order as shown in FIG. 3. For example, DevSecOps practices can use similar phases 302-312 as in FIG. 3 but implement security tools (e.g., analysis tools 328) throughout the life cycle.

The tools 320-330 generate data logs and/or alerts that can be used to analyze security risk. For example, user logs produced during the build phase 304 can indicate whether an unauthorized user has committed changes to source code. As another example, scanning tools can identify vulnerabilities or errors in source code. Other examples of logs include support tickets received during the continuous feedback phase 312. But even if security risk is analyzed in the context of each individual tool 320, the analysis may produce an incomplete or misleading conclusion. For example, security issues that arise from individual tools 320-330 may be correlated to identify a greater risk than the sum of the individual risks associated with each tool; and these individual risks and the overall risk can be quantified using risk scores in accordance with the techniques introduced here.

To achieve a more complete risk analysis, data from logs associated with the tools 320-330 can be stored across multiple phases of the development cycle, beyond the time period in which they are normally used. For example, logs from the build phase 304 contain data that are normally not used in later phases of the SDLC 300. Persistently storing data from an earlier phase allows these data to be combined with data from later time phases when analyzing risk.

To collectively analyze data produced by software tools during different phases or time periods effectively, these data are normalized. This is because the different phases 302-312 have different purposes and involve the use of different software tools. As a result, the data logs produced by different tools 320-330 can have different data fields, formats, etc. To correlate these disparate data, the data are normalized by mapping data fields associated with the tools 320-330 to a common information model. For instance, a mapping can be generated that maps data output from particular tools to a field of the common information model. The common field thus functions as a linking field that can be used to aggregate data from the different tools 320-330 and then analyze the data for security risk.

For example, a customer can submit a support ticket in response to a software issue. This support ticket is received during the feedback phase 312 includes a description of a software issue. The support ticket can also be assigned an issue number. This issue number is then provided to a developer during a subsequent phase, for example when a developer writes code to fix the software issue. The issue number can then be used as a linking field for purposes of analyzing security risk. For example, if a vulnerability is discovered in the source code, then the vulnerability can be correlated with the description of the software issue from the earlier support ticket to assess the potential impacts of the vulnerability. The potential impact can be expressed as a risk score, which is discussed in further detail below.

In some implementations, a security application (e.g., the security application 118), can proactively detect security issues before support tickets are produced during the feedback phase 312. For instance, a repository identifier can serve as a linking field, which does not necessarily depend on the existence of a support ticket. As an example, code using a dependency with a vulnerability can be added to a code repository (e.g., storage facility 112) by a developer during the build phase 304. After the code is deployed successfully and in production, the security application can perform scans of the code repository to identify the vulnerable dependency, produce a risk score, or notify developers in the form a pre-support warning. If the dependency vulnerability has previously been identified, then the security application 118 can modify an existing risk score. During this process, an identifier of the code repository containing the vulnerable code thus serves as a linking field that tracks the vulnerability.

In some implementations, multiple linking fields are used to correlate data from multiple software tools. For example, a first tool, a second tool, and a third tool can be used during different phases of the SDLC 300 of a software application. In this example, the first tool and the second tool produce data that are mapped to a first linking field of the common information model, while the second tool and the third tool produce data that are mapped to a second linking field. In this manner, data produced by the first tool and the third tool can be correlated even though there is no linking field that directly links the two tools.

For example, the first tool can be a project planning tool 320 that uses a field, "ID," to contain identifier data, e.g., an identifier associated with a security issue. However, the second tool, a code management tool 322, can contain corresponding identifier data in a different field, such as "commit_message" or "branch_name." In this example, the fields from the tools 320 and 322 are not compatible, so the data normalization module 102 extracts the identifier data from those fields and maps the identifier data to a field of the common information model 108, such as an issue identifier field, "issueNumber."

Meanwhile, the code management tool 322 can also produce data with a "commit_id" hash number after code is committed. A third tool, an automation tool 324, can also commit code changes and produce similar data using its own hash field "head_commit.id." In this case, the data normalization module 102 maps the data from both tools 322 and 324 to a hash field of the common information model 108, such as "commit_hash." So in this example, the common information model 108 includes two linking fields, "issueNumber" and "commit_hash," that link the project planning tool 320 to the code management tool 322 to the automation tool 324.

These links can then be used to correlate an initial identification of a security issue with subsequent code changes. For example, code changes that fix one security issue may create a new security issue that is not identified until later. But by linking the tools 322-326 using multiple linking fields of the common information model 108, the actions leading up to the subsequent security issue, and the effect of those actions on the overall risk score, can be traced back through the SDLC 300, enabling a developer or analyst to more easily discover root causes.

Using multiple linking fields is beneficial when data from three or more tools cannot be associated with a particular linking field. For example, a release identifier (release ID) can be used as a linking field for tools during the deployment phase 308 and the operation phase 310. But a release ID has not yet been determined during the previous plan phase 302 or build phase 304. To correlate data from the plan phase 302 or the build phase 304 with data from the subsequent deployment phase 308 or operation phase 310, a second linking field can be used. For example, the second linking field can link data from the build phase 304 to the continuous integration phase 306, which is then linked to the deployment phase 308 by a third linking field. Depending on the tools 320-330 used, the second and third linking field can be the same field, or a different field.

In some implementations, the common information model uses at least one of the following as linking fields:

An identifier of code repository with which an issue is associated.

An identifier of larger organization grouping under which a code repository exists.

A repository branch associated with an issue. In some implementations, a branch references an issue.

An issue identifier. For example, the issue identifier can be derived from commit message referencing an issue number (e.g., "Fix #337").

A hash associated with a given commit (e.g., a Secure Hash Algorithm hash).

The list of hashes associated with a commit.

A latest hash of changes included in a push.

An identifier associated with a pull request.

An earliest hash of code being released.

A release identifier

A deploy identifier or a job identifier

A name of a service

A container identifier

A namespace

A virtual machine identifier.

The common information model can be customized for different SDLCs 300, as different organizations often have different development practices. A common information model can be configured for a particular development process by first defining discrete steps of the development process. For example, each of the phases 302-312 of FIG. 3 can correspond to separate steps in which separate software tools are used, e.g., tools 320-330. Fields of the common information model are then defined for the steps or phases. If possible, the fields are defined in a generic or vendor-neutral manner, which enables the common information model to be used for a greater variety of tools.

In some implementations, the SDLC 300 includes steps associated with identifying work issues or bug fixes, such as by receiving support tickets. Example tools used to identify work issues include GitHub, GitLab, Jira, and Trello. For these steps, data from these tools can be mapped to the common information model, which can include at least one of the following as fields:

An identifier of code repository with which an issue is associated

An identifier of an organization or grouping that includes a code repository

An issue identifier (e.g., an ID number)

A repository branch associated with an issue. The repository branch can reference an issue.

A code commit associated with an issue.

A timestamp associated with a given commit.

A username associated with a given commit

A current priority level of an issue

A subject or title of an issue

A description or body of an issue

A link to an issue (e.g., a URL)

A tag applied to the issue.

Figure 4:
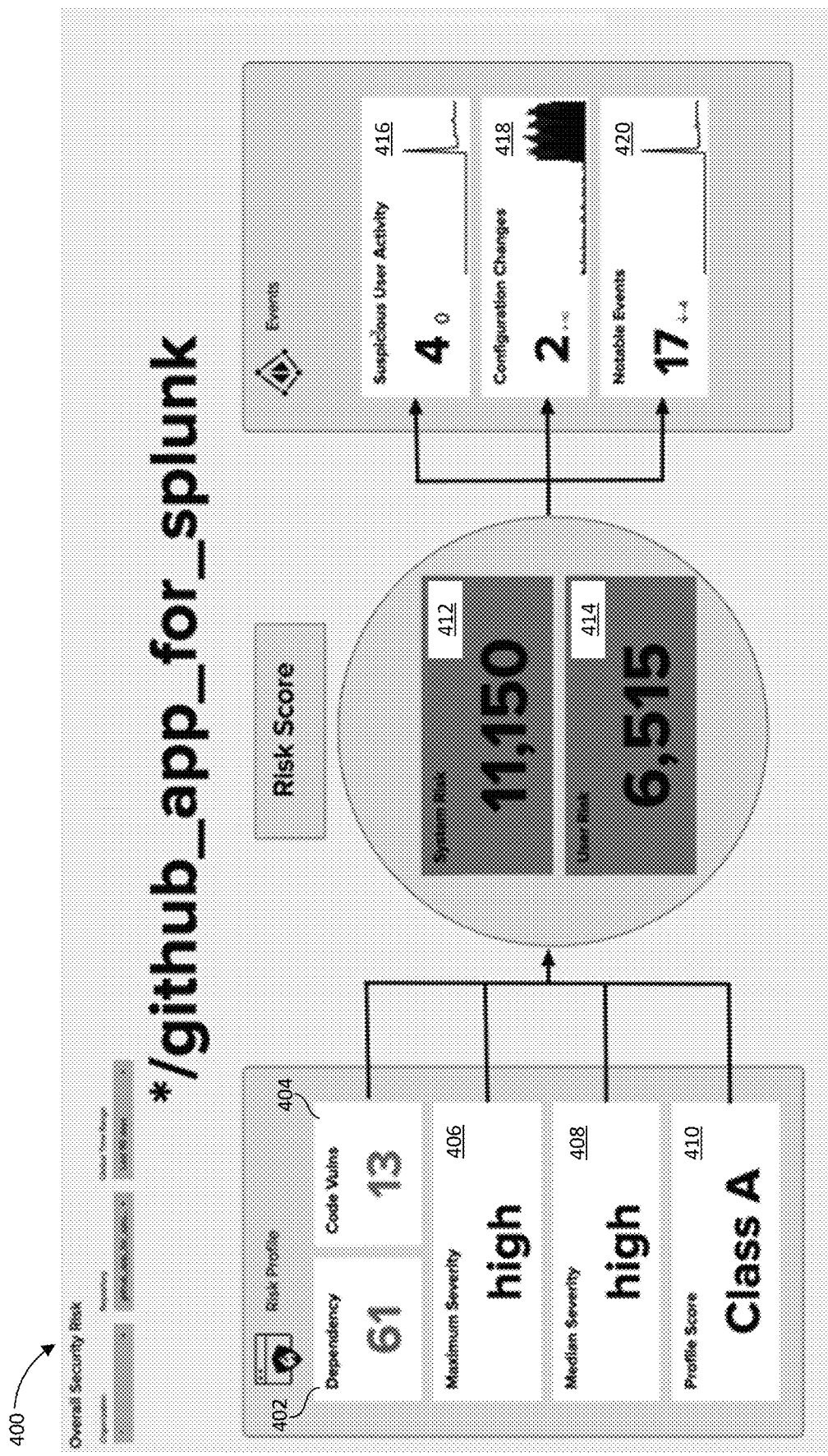
FIG. 4 illustrates an example risk dashboard.

A date associated with user assigned to an issue
A user assigning an issue
A user assigned to an issue
A timestamp associated with a status update to an issue
A current status of an issue (e.g., opened, closed, updated, etc.)
A timestamp of a latest update to an issue
A timestamp when an issue was closed
A timestamp when an issue was created
A user submitting an issue In some implementations, the SDLC 300 includes steps associated with committing code to a repository, such as using Github or Gitlab. For these steps, the common information model can include at least one of the following as fields:

An identifier of code repository with which an issue is associated
An identifier of an organization or grouping that includes a code repository
A branch where code was committed
A hash associated with a given commit, e.g., a Secure Hash Algorithm (SHA) hash.
An issue identifier. For example, the issue identifier can be obtained from a commit message that references an issue number (e.g., "Fix #337").
Files added by a given commit
Files modified by a given commit
Files removed by a given commit
A message included with a given commit
A timestamp of a given commit
A user committing code
A list of hashes associated with committed code In some implementations, the SDLC 300 includes steps of reviewing code. Changes to code are often committed and pushed to a divergent branch before being merged into the main branch of a code repository. A "pull request" is a request to review code before approving the code for committing to the main branch. Tools such as GitHub and GitLab can implement these branching features. For these steps, the common information model can include at least one of the following as fields:

An identifier of code repository with which an issue is associated
An identifier of an organization or grouping that includes a code repository
An identifier associated with a pull request
An issue identifier. For example, the issue identifier can be obtained from a commit message that references an issue number (e.g., "Fix #337")
An action associated with a pull request event (e.g., open, update, approved, merge, etc.)
An indication whether a pull request been merged (e.g., a Boolean)
A time a pull request is merged
An origin branch associated with a pull request
An author of a pull request
A message or body of a pull request
A time a pull request is created
A list of hashes associated with pushed code
A list of commit messages associated with pushed code
A list of timestamps of commits included in push
A list of commit authors associated with pushed code
A latest hash of code in a pull request
A previous hash of committed code in a pull request
A file added by a commit being pushed
A file modified by a commit being pushed
A files removed by a commit being pushed
A timestamp of an earliest commit in a push
An author of an earliest commit in a push
A message associated with an earliest commit in a push
A hash associated with an earliest commit in a push
A timestamp of a latest commit in a push
An author of a latest commit in a push
A message associated with a latest commit in a push
A hash associated with a latest commit in a push
A user assigned to review a pull request.
An author of a review
A current state of a review of a pull request In some implementations, the SDLC 300 includes steps of releasing code from a repository. Example tools used in this step include GitHub, GitLab, or Maven. For these release steps, the common information model can include at least one of the following as fields:

An identifier of code repository with which an issue is associated
An identifier of an organization or grouping that includes a code repository
A release name
A latest hash of code being released
An issue identifier. For example, the issue identifier can be obtained from a commit message that references an issue number (e.g., "Fix #337").
A current status of a release
A user authoring a release
A timestamp of creation of a release
A tag associated with a release
A URL of a release
A user that triggered a release event
An earliest hash of code being released
A name of an asset contained in or added to a release
A content type of an asset contained in or added to a release
A user who uploaded an asset contained in or added to a release In some implementations, the SDLC 300 includes a pipeline, or an automated sequence of actions that can include continuous integration events, release, or deployments. Example tools used in this step include GitHub, GitLab, or Jenkins. For pipeline tools, the common information model can include at least one of the following as fields:

An identifier of code repository with which an issue is associated
An identifier of an organization or grouping that includes a code repository
A pipeline run identifier
A branch of code a pipeline run is associated with
A latest hash associated with pipeline run
A pipeline identifier
An attempt number for a given pipeline run
A name of the pipeline
A result of a pipeline run
A pipeline run identifier
An identifier of a user or process that started a pipeline run
A name of a user or process that started a pipeline run
A status of a pipeline run (e.g., started, testing, packaging, etc.)
A process that triggered a pipeline run
A timestamp of a request to start a pipeline
A pipeline completion indicator (e.g., a Boolean)
A location a pipeline run is created Dependency vulnerabilities can also be mapped to the common information model. A software dependency is a code library or package that is reused in a new piece of software. Therefore, security issues can arise from issues in the underlying dependencies. The common information model can incorporate the dependency vulnerability data by including at least one of the following as fields:

An identifier of code repository with which an issue is associated
An identifier of an organization or grouping that includes a code repository
A severity level of a vulnerability
An identifier of a severity of vulnerability
A type or description of a vulnerability
A category of a vulnerability
An associated event tag
A link to a common vulnerabilities and exposures (CVE) catalog or vulnerability description
A resource where change occurred
A user or entity performing a change.
A business unit of a user
A category of a user
A priority level of a user
An associated certificate
A CVE identifier of a vulnerability
An identity platform identifier
A knowledge base identifier
A type or description of a vulnerability
A product detecting a vulnerability
A cross reference to an affected package
A destination business unit
A destination category
A destination priority Code vulnerabilities can also be mapped to the common information model. The common information model can incorporate code vulnerability data by including at least one of the following as fields:

An identifier of code repository with which an issue is associated
An identifier of an organization or grouping that includes a code repository
A severity level of a vulnerability
A latest hash associated with a code scan
An action related to vulnerability (e.g., appeared_in_branch, created, etc.)
An alert identifier
An identifier of a severity of vulnerability
A type or description of a vulnerability
A category of a vulnerability
A status of a vulnerability
An associated event tag
A link to a common vulnerabilities and exposures (CVE) catalog or vulnerability description
A resource where change occurred
A user or entity performing a change.
A business unit of a user
A category of a user
A priority level of a user
An associated certificate
A rule identifier for a vulnerability
An identity platform identifier
A knowledge base identifier
A type or description of a vulnerability
A product detecting a vulnerability
A cross reference to an affected package
A destination business unit
A destination category
A destination priority FIG. 4 illustrates an example of a risk dashboard 400. The risk dashboard 400 can be generated by the GUI generator 126 of the security application 118 of FIG. 1. The risk dashboard 400 includes information in panels 402-412 indicating risk associated with development of a software application. A data normalization module, e.g., the data normalization module 102 of FIG. 1, ingests data output from various software tools, such as the tools 320-330 of FIG. 3. As part of the ingestion by the data normalization module 102, the data is converted from the individual formats of the software tools to a common information model (e.g., the common information model 108). The information displayed in the panels 402-412 corresponds to searches of the converted data, as executed by the security application 118.

In this example, the panel 402 displays the number of code dependencies associated with the software being developed. A higher number of dependencies increases overall risk, since vulnerabilities in any reused code are applied to the new software. The panel 404 displays the number of vulnerabilities in source code. Source code vulnerabilities can be provided from source code scanning tools, such as GitHub Advanced Security. In some implementations, the data normalization module 102 receives source code vulnerabilities or dependency vulnerabilities from a tool as an alert, such via a webhook.

Software tools used during the development cycle can generate audit logs. Example information that can be derived from audit logs include suspicious user activity as displayed in panel 416 and configuration changes as displayed in panel 418. In some implementations, audit logs are received at the data normalization module 102 by calling a specific software tool. In other implementations, audit logs are received by configuring the software tool to push audit logs to the data normalization module 102. In either case, data from audit log is mapped to the common information model 108.

The same risk dashboard 400 can be used during the entire development process for a software application, by a developer or a security analyst, to track security related issues associated with development of the software application. Because data from multiple tools are mapped to a common information model, the risk dashboard 400 can quickly display analytics indicating risk throughout multiple phases of an SDLC. In contrast, existing risk analytics are limited to individual tools. For example, the panels 402-420 display risk information that is based on aggregated data from throughout the SDLC, such as an aggregate risk score. As a software application progresses through the SDLC, the security application 118 automatically executes searches to update the panels 402-420 based on newly added data. Thus, the risk dashboard 400 enables developers working during a later time period to assess the risk impact of their actions in real-time, even if they are not familiar with the actions taken by developers at an earlier time period. Having access to this real-time risk analysis ultimately improves the security of the software as well as the efficiency of the development process.

The security application 118 performs risk detection searches, which search for a set of defined parameters, and a notable event is generated if the parameters are met. The set of parameters can be derived from multiple tools, e.g., tools 104 of FIG. 1 or tools 320-330 of FIG. 3, because data from the multiple tools are mapped to the common information model. For example, a notable event can be generated based on a first parameter mapped to a code repository tool and a second parameter mapped to a customer support tool, even though these tools do not normally share data with each other. The panel 420 displays the number of notable events detected by a search. The panels 406-410 display risk severity and a profile score.

The risk scoring engine 124 of the security application 118 generates risk scores associated with risk detections. In some implementations, a risk score is determined by first assigning base risk score. The base risk score is configured when the risk detection is defined. When a detection with a risk score creates a notable event, a corresponding risk event is created, and an entity name and total risk score for that event is stored. A total risk score can then be determined by modifying the base risk score based on one or more risk factors, or weights that are based on the profile score of the entity. As a numerical example, if a detection to find known code vulnerabilities has a base risk score of 100, and the profile score indicates that a vulnerability is associated with a critical entity for a company, the risk score for that event can be multiplied by a risk factor of 4, yielding a total risk score of 400. In contrast, an entity that is not designated as critical can be associated with a smaller risk factor. The risk scores for each event can then be aggregated into a risk score for the entire development cycle.

The weights used to adjust risk scores can be customized for different entities associated with a given software application or set of tools, where different entities are identified by fields of the common information model 108. For example, a software application that handles personal information may have two versions being developed, for release in two different regions with different privacy laws. In this example, the source code associated with the two versions can reside in separate repositories. Since the region with more strict privacy laws can present a higher security risk, a user may wish to assign a larger risk factor to the repository associated with the higher risk region. When implementing this risk factor for a notable event, the risk scoring engine 124 can determine the repository associated with the notable event because the data associated with the notable event can be linked to a repository field of the common information model 108 (e.g., a code repository ID).

The security application 118 can raise risk alerts based on one or more risk thresholds. When a risk score associated with an event exceeds a risk threshold, then an alert can be raised. Similarly, risk thresholds can correspond to an aggregate risk score associated with multiple events, such as the system risk in panel 412 and the user risk in panel 414. In some implementations, the software application is already deployed when the risk score is calculated. In such a case, the security application 118 can be configured to automatically revert deployment of the software application.

The risk scores displayed in the panels 412 and 414 can be delineated between system risk in the panel 412 and user risk in the panel 414. System risk is determined by notable events associated with dependency vulnerabilities, configuration changes, and other environmental factors. User risk is determined by notable events associated with suspicious user activity, unsanitized source code, or other user-generated events. For instance, if a user downloads a large number of files in a short time period, that can trigger a notable event. As another example, user risk can be increased when a user changes a tool's setting. Displaying system risk separately from user risk in separate panels 412 and 414 gives developers a big-picture view of the different sources of risk associated with a given software application, while providing more detail than a single aggregate score.

The security application 118 can perform risk detection searches on an ongoing basis throughout the SDLC. For example, a risk score can be updated as new events are received or as new notable events are detected. Risk scores can be updated on a scheduled (e.g., periodic) basis, or according to some combination including manual updates.

Risk scores can be weighted based on other factors. Adjustments to base risk scores can be applied additively (upward or downward), multiplicatively (to scale upward or downward), or a combination thereof. For example, a risk score can be adjusted based on user input indicative of a risk level associated with an anomaly type to which the notable event belongs. Certain anomaly types are inherently riskier than others. Therefore, anomalies of a type deemed inherently riskier than others may be given greater weight than other types of anomalies. Risk scores can also be adjusted based on the frequency of anomalies being generated.

As another example, the potential downtime and recovery cost of a system can be used to weigh the risk scores of notable events. Downtime is a period during which a device or user account is not available for use. As an example, a server that would be offline for a long period of time (should that server need to be taken down to investigate or remediate an anomaly, or for another reason) would be associated with higher risk scores than a back-up server whose downtime would not affect any users. Recovery cost is an indicator of how critical a system is for business continuity. In some organizations, recovery cost is tracked by configuration management databases, or similar tools. As an example, a server that hosts an organization's website, which, if offline, would render the organization's customers unable to conduct business with the organization, would be associated with higher risk scores than a tablet computer belonging to the organization, which can quickly and inexpensively be replaced.

As another example, a risk score can be weighted based on the cost or value of a device or IT infrastructure with which an event is associated, or the number of users or devices that access the subject device. More specifically, an event associated with an expensive or valuable server (e.g., the server that hosts confidential user data), or one that is accessed by many users/devices, may be deemed to involve higher than average risk, and therefore, may be given greater weight. Additionally, events associated with users who frequently use high value assets may be given greater weight than events associated with users of lower-value assets.

As yet another example, a risk score can be weighted based on role within an organization of a user with which the event is associated. More particularly, an event associated with a user who occupies high-level role within an organization may be deemed to involve higher risk than an anomaly associated with a user who occupies a mid-level or lower-level role in the organization. As an example, an event associated with the user account of an organization's head of network security would be given greater weight, while an event associated with the user account of an intern might be given less weight. A user's role can, additionally or alternatively, be used to identify anomalous behavior. For example, a user's role may be expected to interact with a certain set of software tools. In this example, should the user access, download, or otherwise interact with a tool that is not within the user's role, then the user's behavior may be flagged as anomalous.

Users can be classified according to the assets with which the users interact, and these classifications can be used to modify the risk scores of anomalies associated with those users. As an example, user accounts of members of a software development team, who access only the servers that host the software code, may be classified as ordinary users, and anomalies associated with ordinary users may not be given any weight adjustment. A subset of these users, however, that have access to cloud servers that host the software for customer use, may be classified as privileged users, and anomalies associated with this subset of users may be given greater weight.

In a similar fashion, assets can be classified according to the users that access the assets and the roles of these users, and the classification of the assets can be used to adjust the risk scores of anomalies associated with those assets. For example, an email server that is only accessed by a company's executive officers may be associated with a higher weight, while an email server that is accessed by everyone in the company may be associated with a lower weight.

Other data sources can, additionally or alternatively, be used to weight risk scores. For example, information from human resources data can be used to weight anomalies associated with certain users, and/or to flag users who may be high risk. Human resources data may include, for example, employee review data, which may indicate that an employee received bad reviews, and/or indicators that the employee was nominated for a promotion but was denied, had frequent meetings with managers, experienced frequent manager changes, or other indicators that the employee is dissatisfied or may be contemplating leaving the company. A user account associated with such an employee may be flagged as high risk, since a dissatisfied employee may engage in careless or destructive behavior towards the company. Thus, for example, a code change associated with the high-risk account can result in a larger risk score.

Another factor that can be used to weight a risk score is the rate of change of the risk score and/or the risk scores of related entities. For example, source code associated with a base risk score that has risen from 200 to 500 over a period of 24 hours may be associated with higher risk level than source code whose risk score has risen from 200 to 500 over a period of one week.

Any of these factors used to weight risk score can be used to determine the profile score displayed in panel 410. The profile score can be expressed in terms of "classes", such as "Class A", "Class B", etc., where "Class A" indicates a more critical or more valuable entity. In other implementations, the profile score is expressed as a numerical value, a color, or using words (e.g., "high").

In some implementations, a "risk level" (also called a "risk severity") is a specified range of risk scores. The risk score associated with a notable event can assigned to one risk level at any given point in time, although an entity's risk level may change over time (e.g., as new data is received and analyzed by the system). For example, risk scores may be assigned from 0 to 100, where scores 67 to 100 correspond to a "high" risk level, as shown in the panels 406 and 408, scores 34 to 66 correspond to "moderate" risk level, and scores 0 to 33 correspond to a "low" risk level. The thresholds between risk levels may be different, and/or a greater or fewer number of risk levels may be used. Further, the mapping of risk score to risk level can either be fixed (as described above) or dynamic based on some algorithm. For example, the algorithm may examine all of the risk scores in the enterprise and determine that it is common for those risk scores to be between 50 and 90 and therefore make this level to be of a lower level. Additionally, the number of risk levels, the thresholds between risk levels, and/or the mapping of risk scores to risk levels all can be user-modifiable.

Figure 5:
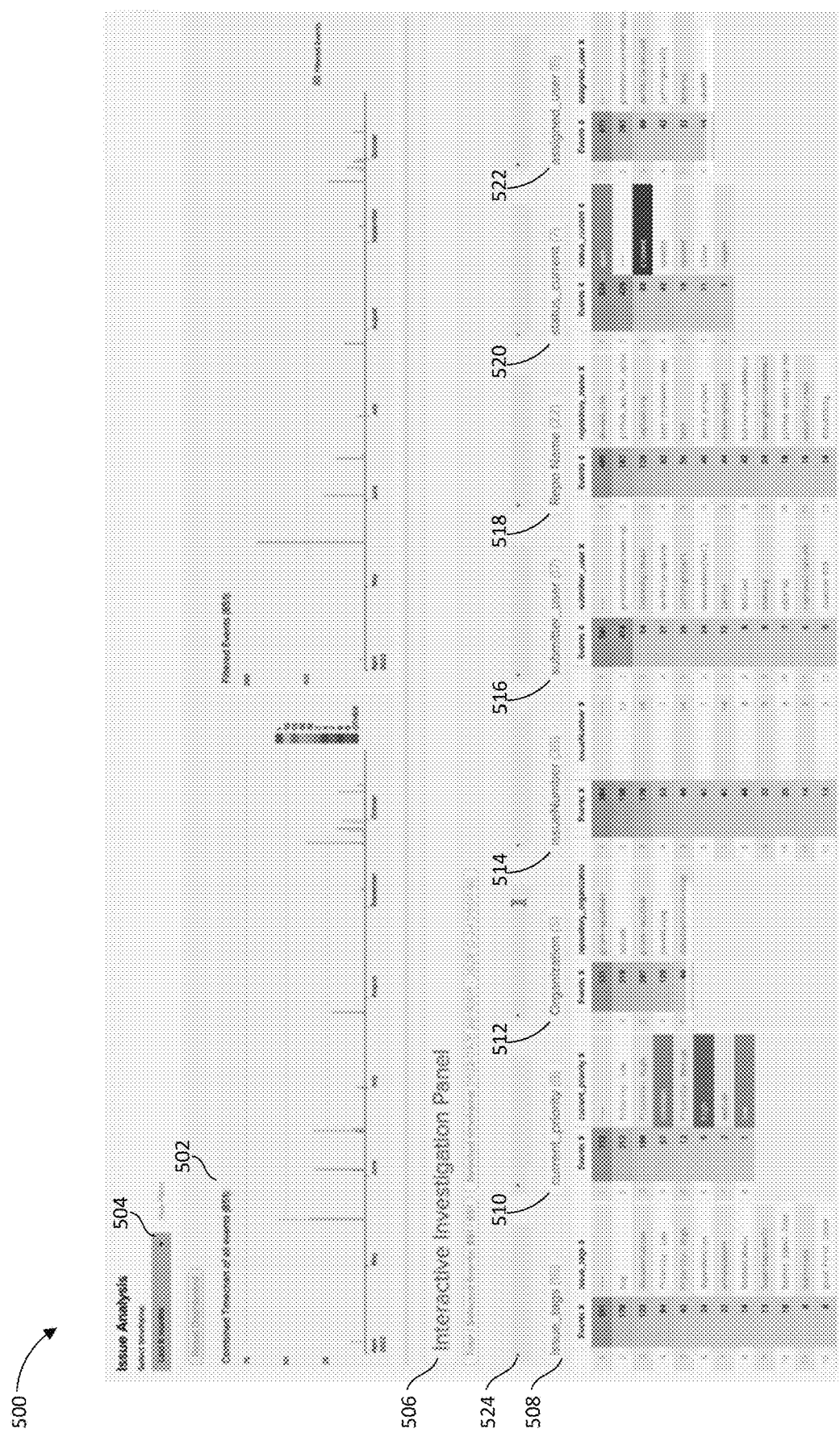
FIG. 5 illustrates an example issue analysis dashboard.

FIG. 5 illustrates an example of an issue analysis dashboard 500 that displays more detailed information regarding security issues that contribute to the risk shown in the risk dashboard 400 of FIG. 4. The issue analysis dashboard can be generated by the GUI generator 126 of FIG. 1. For example, the time chart 502 shows timestamps associated with events in a selected timeframe 504. The issue analysis dashboard 500 brings together security issues from multiple software tools using the common information model 108. This enables users working with different software tools to use the same dashboard to analyze security issues. For example, a user can use a first tool and investigate issues using the issue analysis dashboard 500. The same user can then switch to a second tool, and any issues arising from the second tool will automatically be populated in the same issue analysis dashboard 500. As a result, user experience is improved, and security investigations are faster compared to conventional methods.

The interactive investigation panel 506 shows various attributes of the returned events, along with the number of events having the attributes, where the attributes correspond to fields of the common information model. Each attribute is associated with a subpanel 508-522 that a user can manipulate to further investigate issues. For example, the subpanel 508 shows issue tags associated the events. The issue tags can indicate the type of issue (e.g., dependencies or bugs), a priority level, or any other information deemed useful (e.g., "BatmanLabelz"). The subpanel 510 shows current priority levels, which are represented as "high", "medium", and "low." Priority levels can also be represented by a color or numerical value. A user can select a specific issue tag to obtain further information, such as specific events associated with the selected issue tag or risk scores.

The subpanels 508-522 each include a search field 524. A user can use the search field to narrow the events returned in the respective subpanel 508-520. Specific fields, time frames, risk scores, repositories, or other information can be used to filter the events. For example, the subpanel 508 shown in FIG. 1 displays 170 events with the issue tag "bug." A user can use the search field 524 to search for events with "current_priority=high." The events shown in the subpanel 508 are then reduced to only those with an attribute current_priority=high, and the 170 events are accordingly reduced.

The subpanel 512 shows an organization associated with the events, which indicates a grouping of code repository associated with the event. For example, the event can be a source code modification or an event linked to a source code modification, where the source code being modified is stored in a particular code repository. Similarly, the subpanel 518 shows repository names associated with events. A "repository name "identifies a code repository, while an "organization" refers to a grouping that can contain one or more code repositories (and may also contain other elements beside code repositories).

The subpanel 514 displays issue numbers associated with events. In some implementations, the issue numbers are initially mapped from support tickets, such as Jira or Zendesk tickets. The subpanel 516 shows users who submitted issues associated with event. The subpanel 520 shows a current status of issues associated with events, such as "open" or "closed." The subpanel 522 shows users assigned to issues associated with each event, such as an engineer assigned to fix a bug.

Besides the subpanels 508-522 shown in FIG. 5, the issue analysis dashboard 500 can include a different number of subpanels 508-522. The subpanels 508-522 can also include different types of information, such as any of the fields in the common information model as previously listed. In some implementations, the issue analysis dashboard 500 can be customized by the user.

FIG. 6 is a flowchart illustrating an example process 600 for managing security of an SDLC.

The example process 600 can be implemented, for example, by a computing device that comprises a processor and a non-transitory computer-readable medium. The non-transitory computer readable medium can be storing instructions that, when executed by the processor, can cause the processor to perform the operations of the illustrated process 600. Alternatively or additionally, the process 600 can be implemented using a non-transitory computer-readable medium storing instructions that, when executed by one or more processors, cause the one or more processors to perform the operations of the process 600 of FIG. 6.

At step 602, data is collected from a plurality of software tools used to develop a software program (e.g., tools 104 of FIG. 1 or tools 320-330 of FIG. 3). The data is generated by the plurality of tools during development of the software program. For example, the data can be collected by data normalization module 102. The software program is developed in part by use of a first software tool of the plurality of software tools.

In some implementations, data generated by the plurality of software tools includes information relating to a commit, review, or release of code of the software program.

At step 604, the collected data from step 602 is normalized, thereby producing normalized data. In some implementations, the data is normalized by mapping the data to the common information model 108. For example, the common information model 108 can include a set of linking fields, where the set of linking fields are fields to which data collected from at least two of the plurality of software tools are mapped to. In some implementations, the normalizing of the data comprises mapping the data generated by the plurality of software tools to a common issue identifier or a hash.

At step 606, the normalized data is stored persistently in a storage facility 114 beyond a usage period of the first software tool. The storage facility 114 can be included in the DIQS 110 and can be similar to the index 838 shown in FIG. 8.

At step 608, a security issue associated with the software program by analyzing the normalized data (e.g., by the security application 118). The security issue is identified after the usage period of the first software tool. At step 610, an alert indicative of the security issue is displayed in a graphical user interface. The graphical user interface can be produced by a different application from the plurality of software tools from which data is collected in step 602. For example, the graphical user interface can be part of a security application 118 and generated by the GUI generator 126. The graphical user interface can include the dashboard 400 or 500 of FIGS. 4 and 5.

In some implementations, the software program is developed by use of a second software tool of the plurality of software tools. At least a portion of a usage period of the second software tool occurs after the usage period of the first software tool, for example during a later phase of the SDLC of the software program. The security issue can be identified during the usage period of the second software tool and after the usage period of the first software tool.

In some implementations, the process 600 includes executing a search of the normalized data for a set of parameters, wherein the set of parameters is associated with at least two of the plurality of software tools. Based on identifying the set of parameters in the normalized data, a notable event is identified. A risk score associated with the notable event is assessed. The security issue is identified based on a determination that the risk score exceeds a threshold value. In some implementations, an alert is generated that indicates the security issue exceeds the threshold. In some implementations, a tool is triggered that reverts a deployment of the software program.

In some implementations, the security issue corresponds to a first base risk score of a first event associated with the first software tool and a second base risk score of a second event associated with a second software tool of the plurality of software tools. In this case, the security application 118 can generate a total risk score by combining the first base risk score adjusted by a first weight with the second base risk score adjusted by a second weight.

In some implementations, security issue is identified based on first data and second data. The first data is associated with an alert indicating a source code vulnerability or a dependency vulnerability, and the second data is associated with an audit log indicating user activity or a configuration change. For example, the first and second data can be received from separate software tools.

In some implementations, the process 600 includes computing a user risk score based on user activity represented in the data. For example, the user activity can include unauthorized access or configuration changes. The process 600 can also include computing a system risk score based on system-generated events represented in the data, such as source code or dependency alerts. The security issue can then be identified based on both the user risk score and the system risk score.

In some implementations, the process 600 further includes collecting, by the data normalization module 102, additional data generated by a second software tool used to develop the software program. The second software tool can be used after the usage period of the first software tool from step 602. The additional data is normalized, persisted, and aggregated with the normalized data from steps 602-606 to produce aggregated data. Based on the aggregated data, the identification of the security issue of the software program can be updated. For example, an aggregate risk score can be updated. In some implementations, a first risk score is calculated that indicates a low severity associated with the security issue. Then after the additional data from the second software tool is aggregated, a second risk score is calculated based on the aggregated data. The second risk score can indicate a high severity associated with the software data. For example, this change in severity can occur because additional actions have compounded the security issue or because the security issue has become more severe while it has been left unresolved. This process can continue as additional software tools are used or on a periodic basis, such that developers are kept up-to-date on the security status of the software program.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smartphones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (Saas) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 7:
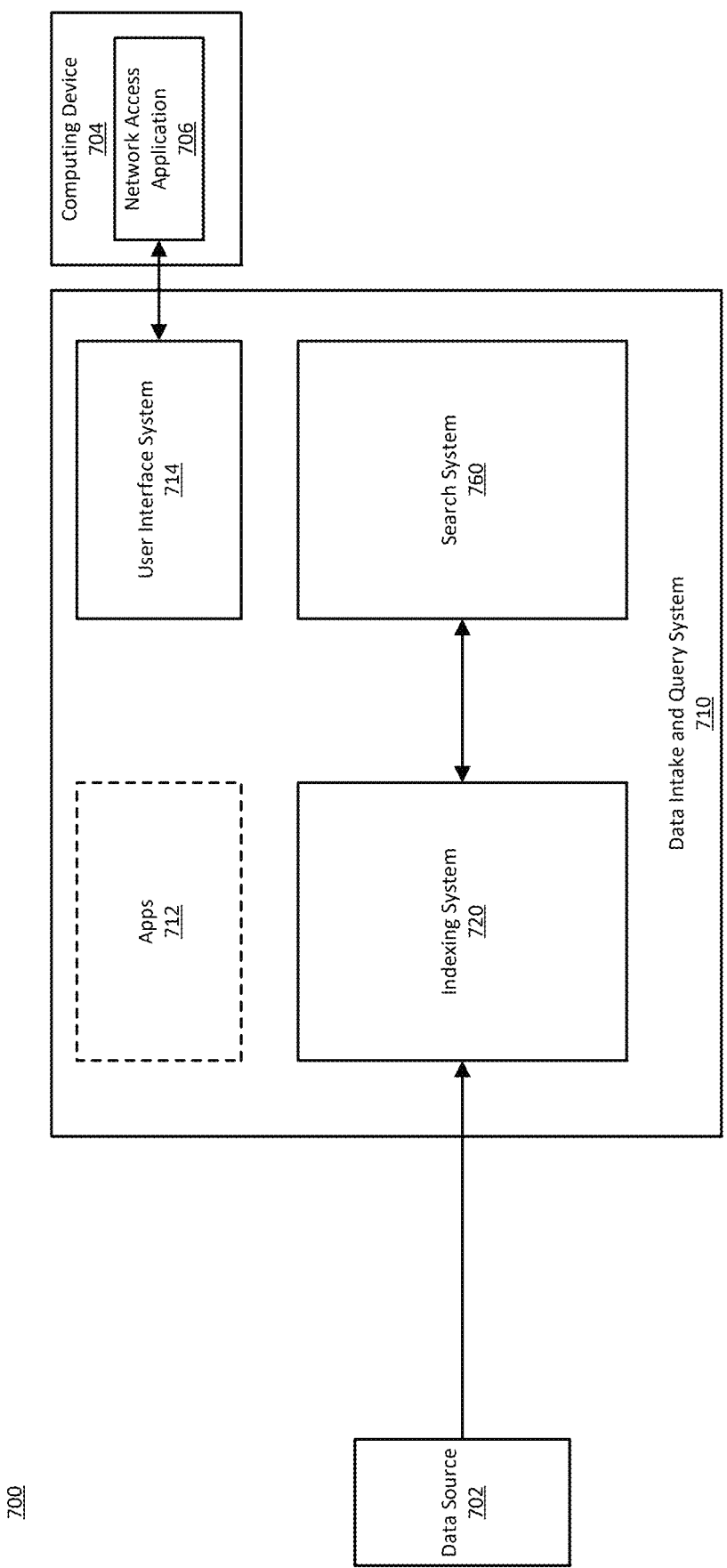
FIG. 7 is a block diagram illustrating an example computing environment that includes a data intake and query system.

FIG. 7 is a block diagram illustrating an example computing environment 700 that includes a data intake and query system 710. The data intake and query system 710 obtains data from a data source 702 in the computing environment 700, and ingests the data using an indexing system 720. A search system 760 of the data intake and query system 710 enables users to navigate the indexed data. Though drawn with separate boxes in FIG. 7, in some implementations the indexing system 720 and the search system 760 can have overlapping components. A computing device 704, running a network access application 706, can communicate with the data intake and query system 710 through a user interface system 714 of the data intake and query system 710. Using the computing device 704, a user can perform various operations with respect to the data intake and query system 710, such as administration of the data intake and query system 710, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 710 can further optionally include apps 712 that extend the search, analytics, and/or visualization capabilities of the data intake and query system 710.

The data intake and query system 710 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 710 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 710 can be executed on a single computing device, or execution of the program code can be distributed over multiple computing devices. For example, the program code can include instructions for both indexing and search components (which may be part of the indexing system 720 and/or the search system 760, respectively), which can be executed on a computing device that also provides the data source 702. As another example, the program code can be executed on one computing device, where execution of the program code provides both indexing and search components, while another copy of the program code executes on a second computing device that provides the data source 702. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 702 of the computing environment 700 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 702 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 720 obtains machine data from the data source 702 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 720 does not require prior knowledge of the structure of incoming data (e.g., the indexing system 720 does not need to be provided with a schema describing the data). Additionally, the indexing system 720 retains a copy of the data as it was received by the indexing system 720 such that the original data is always available for searching (e.g., no data is discarded, though, in some examples, the indexing system 720 can be configured to do so).

The search system 760 searches the data stored by the indexing system 720. As discussed in greater detail below, the search system 760 enables users associated with the computing environment 700 (and possibly also other users) to navigate the data, generate reports, and visualize search results in "dashboards" output using a graphical interface. Using the facilities of the search system 760, users can obtain insights about the data, such as retrieving events from an index, calculating metrics, searching for specific conditions within a rolling time window, identifying patterns in the data, and predicting future trends, among other examples. To achieve greater efficiency, the search system 760 can apply map-reduce methods to parallelize searching of large volumes of data. Additionally, because the original data is available, the search system 760 can apply a schema to the data at search time. This allows different structures to be applied to the same data, or for the structure to be modified if or when the content of the data changes. Application of a schema at search time may be referred to herein as a late-binding schema technique.

The user interface system 714 provides mechanisms through which users associated with the computing environment 700 (and possibly others) can interact with the data intake and query system 710. These interactions can include configuration, administration, and management of the indexing system 720, initiation and/or scheduling of queries that are to be processed by the search system 760, receipt or reporting of search results, and/or visualization of search results. The user interface system 714 can include, for example, facilities to provide a command line interface or a web-based interface.

Users can access the user interface system 714 using a computing device 704 that communicates with data intake and query system 710, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 700. For example, a person can log in as a particular user and, using the user's digital information, can access the data intake and query system 710. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 704 can provide a human-machine interface through which a person can have a digital presence in the computing environment 700 in the form of a user. The computing device 704 is an electronic device having one or more processors and a memory capable of storing instructions for execution by the one or more processors. The computing device 704 can further include input/output (I/O) hardware and a network interface. Applications executed by the computing device 704 can include a network access application 706, such as a web browser, which can use a network interface of the client computing device 704 to communicate, over a network, with the user interface system 714 of the data intake and query system 710. The user interface system 714 can use the network access application 706 to generate user interfaces that enable a user to interact with the data intake and query system 710. A web browser is one example of a network access application. A shell tool can also be used as a network access application. In some examples, the data intake and query system 710 is an application executing on the computing device 704. In such examples, the network access application 706 can access the user interface system 714 without going over a network.

The data intake and query system 710 can optionally include apps 712. An app of the data intake and query system 710 is a collection of configurations, knowledge objects (a user-defined entity that enriches the data in the data intake and query system 710), views, and dashboards that may provide additional functionality, different techniques for searching the data, and/or additional insights into the data. The data intake and query system 710 can execute multiple applications simultaneously. Example applications include an information technology service intelligence application, which can monitor and analyze the performance and behavior of the computing environment 700, and an enterprise security application, which can include content and searches to assist security analysts in diagnosing and acting on anomalous or malicious behavior in the computing environment 700.

Though FIG. 7 illustrates only one data source, in practical implementations, the computing environment 700 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 700, the data intake and query system 710 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 700 can include on-prem and cloud-based computing resources, or only cloud-based resources. For example, an entity may have on-prem computing devices and a private cloud. In this example, the entity operates the data intake and query system 710 and can choose to execute the data intake and query system 710 on an on-prem computing device or in the cloud. In another example, a provider entity operates the data intake and query system 710 in a public cloud and provides the functionality of the data intake and query system 710 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 710. In some implementations, the entity providing the data intake and query system 710 is itself subscribing to the cloud services of a cloud service provider. As an example, a first entity provides computing resources under a public cloud service model, a second entity subscribes to the cloud services of the first provider entity and uses the cloud computing resources to operate the data intake and query system 710, and a third entity can subscribe to the services of the second provider entity in order to use the functionality of the data intake and query system 710. In this example, the data sources are associated with the third entity, users accessing the data intake and query system 710 are associated with the third entity, and the analytics and insights provided by the data intake and query system 710 are for purposes of the third entity's operations.

Figure 8:
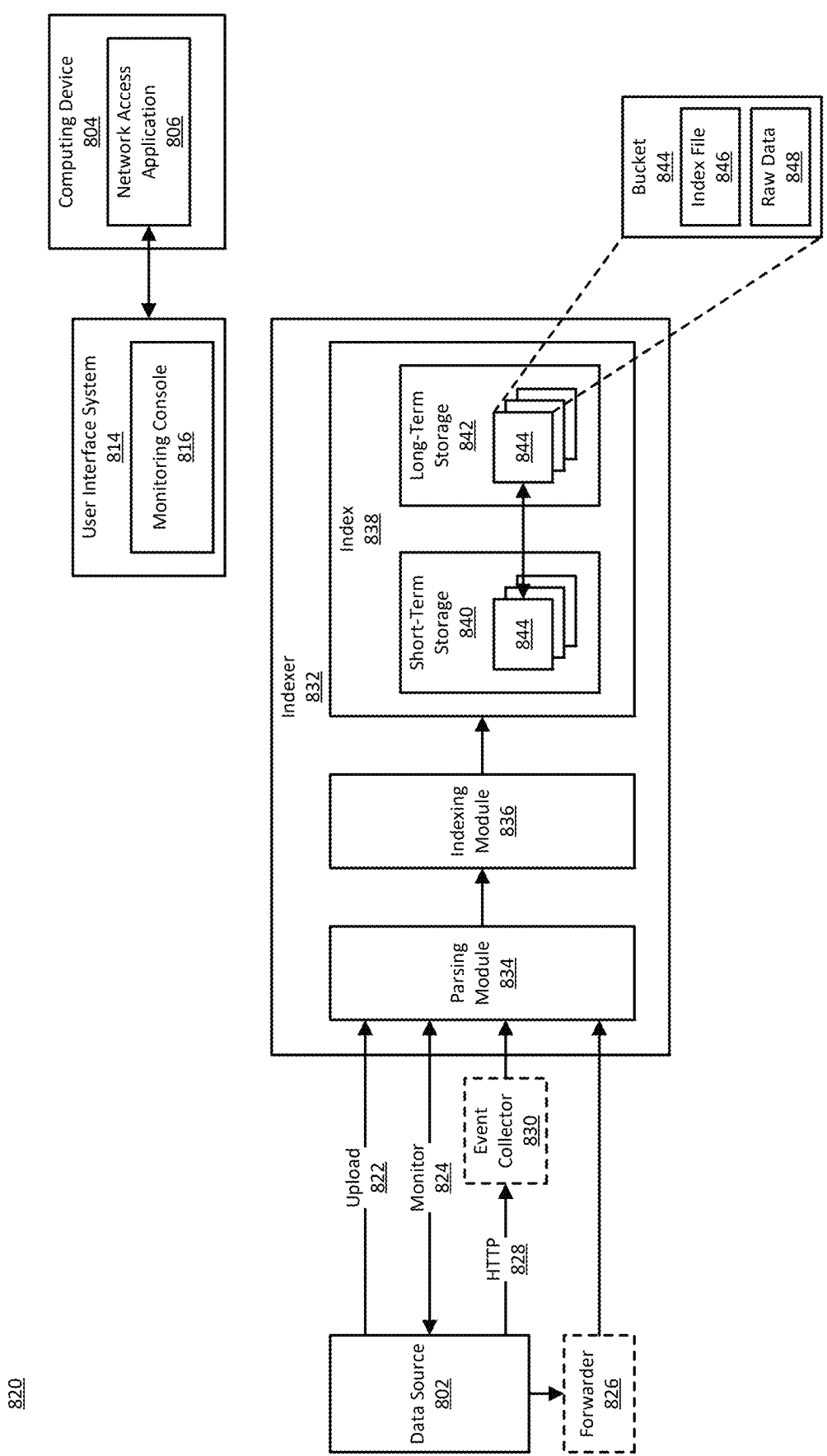
FIG. 8 is a block diagram illustrating an example of an indexing system of a data intake and query system.

FIG. 8 is a block diagram illustrating in greater detail an example of an indexing system 820 of a data intake and query system, such as the data intake and query system 710 of FIG. 7. The indexing system 820 of FIG. 8 uses various methods to obtain machine data from a data source 802 and stores the data in an index 838 of an indexer 832. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 820 enables the data intake and query system to obtain the machine data produced by the data source 802 and to store the data for searching and retrieval.

Users can administer the operations of the indexing system 820 using a computing device 804 that can access the indexing system 820 through a user interface system 814 of the data intake and query system. For example, the computing device 804 can be executing a network access application 806, such as a web browser or a terminal, through which a user can access a monitoring console 816 provided by the user interface system 814. The monitoring console 816 can enable operations such as: identifying the data source 802 for data ingestion; configuring the indexer 832 to index the data from the data source 802; configuring a data ingestion method; configuring, deploying, and managing clusters of indexers; and viewing the topology and performance of a deployment of the data intake and query system, among other operations. The operations performed by the indexing system 820 may be referred to as "index time" operations, which are distinct from "search time" operations that are discussed further below.

The indexer 832, which may be referred to herein as a data indexing component, coordinates and performs most of the index time operations. The indexer 832 can be implemented using program code that can be executed on a computing device. The program code for the indexer 832 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 832. In some implementations, the indexer 832 executes on the computing device 804 through which a user can access the indexing system 820. In some implementations, the indexer 832 executes on a different computing device than the illustrated computing device 804.

The indexer 832 may be executing on the computing device that also provides the data source 802 or may be executing on a different computing device. In implementations wherein the indexer 832 is on the same computing device as the data source 802, the data produced by the data source 802 may be referred to as "local data." In other implementations the data source 802 is a component of a first computing device and the indexer 832 executes on a second computing device that is different from the first computing device. In these implementations, the data produced by the data source 802 may be referred to as "remote data." In some implementations, the first computing device is "on-prem" and in some implementations the first computing device is "in the cloud." In some implementations, the indexer 832 executes on a computing device in the cloud and the operations of the indexer 832 are provided as a service to entities that subscribe to the services provided by the data intake and query system.

For a given data produced by the data source 802, the indexing system 820 can be configured to use one of several methods to ingest the data into the indexer 832. These methods include upload 822, monitor 824, using a forwarder 826, or using HyperText Transfer Protocol (HTTP 828) and an event collector 830. These and other methods for data ingestion may be referred to as "getting data in" (GDI) methods.

Using the upload 822 method, a user can specify a file for uploading into the indexer 832. For example, the monitoring console 816 can include commands or an interface through which the user can specify where the file is located (e.g., on which computing device and/or in which directory of a file system) and the name of the file. The file may be located at the data source 802 or maybe on the computing device where the indexer 832 is executing. Once uploading is initiated, the indexer 832 processes the file, as discussed further below. Uploading is a manual process and occurs when instigated by a user. For automated data ingestion, the other ingestion methods are used.

The monitor 824 method enables the indexing system 820 to monitor the data source 802 and continuously or periodically obtain data produced by the data source 802 for ingestion by the indexer 832. For example, using the monitoring console 816, a user can specify a file or directory for monitoring. In this example, the indexing system 820 can execute a monitoring process that detects whenever the file or directory is modified and causes the file or directory contents to be sent to the indexer 832. As another example, a user can specify a network port for monitoring. In this example, a monitoring process can capture data received at or transmitting from the network port and cause the data to be sent to the indexer 832. In various examples, monitoring can also be configured for data sources such as operating system event logs, performance data generated by an operating system, operating system registries, operating system directory services, and other data sources.

Monitoring is available when the data source 802 is local to the indexer 832 (e.g., the data source 802 is on the computing device where the indexer 832 is executing). Other data ingestion methods, including forwarding and the event collector 830, can be used for either local or remote data sources.

A forwarder 826, which may be referred to herein as a data forwarding component, is a software process that sends data from the data source 802 to the indexer 832. The forwarder 826 can be implemented using program code that can be executed on the computer device that provides the data source 802. A user launches the program code for the forwarder 826 on the computing device that provides the data source 802. The user can further configure the forwarder 826, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 826 can provide various capabilities. For example, the forwarder 826 can send the data unprocessed or can perform minimal processing on the data before sending the data to the indexer 832. Minimal processing can include, for example, adding metadata tags to the data to identify a source, source type, and/or host, among other information, dividing the data into blocks, and/or applying a timestamp to the data. In some implementations, the forwarder 826 can break the data into individual events (event generation is discussed further below) and send the events to a receiver. Other operations that the forwarder 826 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 830 provides an alternate method for obtaining data from the data source 802. The event collector 830 enables data and application events to be sent to the indexer 832 using HTTP 828. The event collector 830 can be implemented using program code that can be executing on a computing device. The program code may be a component of the data intake and query system or can be a standalone component that can be executed independently of the data intake and query system and operates in cooperation with the data intake and query system.

To use the event collector 830, a user can, for example using the monitoring console 816 or a similar interface provided by the user interface system 814, enable the event collector 830 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 802 as an alternative method to using a username and password for authentication.

To send data to the event collector 830, the data source 802 is supplied with a token and can then send HTTP 828 requests to the event collector 830. To send HTTP 828 requests, the data source 802 can be configured to use an HTTP client and/or to use logging libraries such as those supplied by Java, JavaScript, and .NET libraries. An HTTP client enables the data source 802 to send data to the event collector 830 by supplying the data, and a Uniform Resource Identifier (URI) for the event collector 830 to the HTTP client. The HTTP client then handles establishing a connection with the event collector 830, transmitting a request containing the data, closing the connection, and receiving an acknowledgment if the event collector 830 sends one. Logging libraries enable HTTP 828 requests to the event collector 830 to be generated directly by the data source. For example, an application can include or link a logging library, and through functionality provided by the logging library manage establishing a connection with the event collector 830, transmitting a request, and receiving an acknowledgement.

An HTTP 828 request to the event collector 830 can contain a token, a channel identifier, event metadata, and/or event data. The token authenticates the request with the event collector 830. The channel identifier, if available in the indexing system 820, enables the event collector 830 to segregate and keep separate data from different data sources. The event metadata can include one or more key-value pairs that describe the data source 802 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 830 extracts events from HTTP 828 requests and sends the events to the indexer 832. The event collector 830 can further be configured to send events to one or more indexers. Extracting the events can include associating any metadata in a request with the event or events included in the request. In these implementations, event generation by the indexer 832 (discussed further below) is bypassed, and the indexer 832 moves the events directly to indexing. In some implementations, the event collector 830 extracts event data from a request and outputs the event data to the indexer 832, and the indexer generates events from the event data. In some implementations, the event collector 830 sends an acknowledgement message to the data source 802 to indicate that the event collector 830 has received a particular request form the data source 802, and/or to indicate to the data source 802 that events in the request have been added to an index.

The indexer 832 ingests incoming data and transforms the data into searchable knowledge in the form of events. In the data intake and query system, an event is a single piece of data that represents activity of the component represented in FIG. 8 by the data source 802. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 832 can include a parsing module 834 and an indexing module 836 for generating and storing the events. The parsing module 834 and indexing module 836 can be modular and pipelined, such that one component can be operating on a first set of data while the second component is simultaneously operating on a second sent of data. Additionally, the indexer 832 may at any time have multiple instances of the parsing module 834 and indexing module 836, with each set of instances configured to simultaneously operate on data from the same data source or from different data sources. The parsing module 834 and indexing module 836 are illustrated in FIG. 8 to facilitate discussion, with the understanding that implementations with other components are possible to achieve the same functionality.

The parsing module 834 determines information about incoming event data, where the information can be used to identify events within the event data. For example, the parsing module 834 can associate a source type with the event data. A source type identifies the data source 802 and describes a possible data structure of event data produced by the data source 802. For example, the source type can indicate which fields to expect in events generated at the data source 802 and the keys for the values in the fields, and possibly other information such as sizes of fields, an order of the fields, a field separator, and so on. The source type of the data source 802 can be specified when the data source 802 is configured as a source of event data. Alternatively, the parsing module 834 can determine the source type from the event data, for example from an event field in the event data or using machine learning techniques applied to the event data.

Other information that the parsing module 834 can determine includes timestamps. In some cases, an event includes a timestamp as a field, and the timestamp indicates a point in time when the action represented by the event occurred or was recorded by the data source 802 as event data. In these cases, the parsing module 834 may be able to determine from the source type associated with the event data that the timestamps can be extracted from the events themselves. In some cases, an event does not include a timestamp and the parsing module 834 determines a timestamp for the event, for example from a name associated with the event data from the data source 802 (e.g., a file name when the event data is in the form of a file) or a time associated with the event data (e.g., a file modification time). As another example, when the parsing module 834 is not able to determine a timestamp from the event data, the parsing module 834 may use the time at which it is indexing the event data. As another example, the parsing module 834 can use a user-configured rule to determine the timestamps to associate with events.

The parsing module 834 can further determine event boundaries. In some cases, a single line (e.g., a sequence of characters ending with a line termination) in event data represents one event while in other cases, a single line represents multiple events. In yet other cases, one event may span multiple lines within the event data. The parsing module 834 may be able to determine event boundaries from the source type associated with the event data, for example from a data structure indicated by the source type. In some implementations, a user can configure rules the parsing module 834 can use to identify event boundaries.

The parsing module 834 can further extract data from events and possibly also perform transformations on the events. For example, the parsing module 834 can extract a set of fields (key-value pairs) for each event, such as a host or hostname, source or source name, and/or source type. The parsing module 834 may extract certain fields by default or based on a user configuration. Alternatively or additionally, the parsing module 834 may add fields to events, such as a source type or a user-configured field. As another example of a transformation, the parsing module 834 can anonymize fields in events to mask sensitive information, such as social security numbers or account numbers. Anonymizing fields can include changing or replacing values of specific fields. The parsing component 834 can further perform user-configured transformations.

The parsing module 834 outputs the results of processing incoming event data to the indexing module 836, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 832 can be configured to identify searchable segments that are parts of fields, searchable segments that are entire fields, or both. The parsing module 834 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 846, to find event data that matches a search query. In some implementations, segmentation can alternatively be performed by the forwarder 826. Segmentation can also be disabled, in which case the indexer 832 will not build a lexicon for the event data. When segmentation is disabled, the search system searches the event data directly.

Building index data structures generates the index 838. The index 838 is a storage data structure on a storage device (e.g., a disk drive or other physical device for storing digital data). The storage device may be a component of the computing device on which the indexer 832 is operating (referred to herein as local storage) or may be a component of a different computing device (referred to herein as remote storage) that the indexer 838 has access to over a network. The indexer 832 can manage more than one index and can manage indexes of different types. For example, the indexer 832 can manage event indexes, which impose minimal structure on stored data and can accommodate any type of data. As another example, the indexer 832 can manage metrics indexes, which use a highly structured format to handle the higher volume and lower latency demands associated with metrics data.

The indexing module 836 organizes files in the index 838 in directories referred to as buckets. The files in a bucket 844 can include raw data files, index files, and possibly also other metadata files. As used herein, "raw data" means data as when the data was produced by the data source 802, without alteration to the format or content. As noted previously, the parsing component 834 may add fields to event data and/or perform transformations on fields in the event data. Event data that has been altered in this way is referred to herein as enriched data. A raw data file 848 can include enriched data, in addition to or instead of raw data. The raw data file 848 may be compressed to reduce disk usage. An index file 846, which may also be referred to herein as a "time-series index" or tsidx file, contains metadata that the indexer 832 can use to search a corresponding raw data file 848. As noted above, the metadata in the index file 846 includes a lexicon of the event data, which associates each unique keyword in the event data with a reference to the location of event data within the raw data file 848. The keyword data in the index file 846 may also be referred to as an inverted index. In various implementations, the data intake and query system can use index files for other purposes, such as to store data summarizations that can be used to accelerate searches.

A bucket 844 includes event data for a particular range of time. The indexing module 836 arranges buckets in the index 838 according to the age of the buckets, such that buckets for more recent ranges of time are stored in short-term storage 840 and buckets for less recent ranges of time are stored in long-term storage 842. Short-term storage 840 may be faster to access while long-term storage 842 may be slower to access. Buckets may be moves from short-term storage 840 to long-term storage 842 according to a configurable data retention policy, which can indicate at what point in time a bucket is old enough to be moved.

A bucket's location in short-term storage 840 or long-term storage 842 can also be indicated by the bucket's status. As an example, a bucket's status can be "hot," "warm," "cold," "frozen," or "thawed." In this example, hot bucket is one to which the indexer 832 is writing data and the bucket becomes a warm bucket when the indexer 832 stops writing data to it. In this example, both hot and warm buckets reside in short-term storage 840. Continuing this example, when a warm bucket is moved to long-term storage 842, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 820 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 820 through the monitoring console 816 provided by the user interface system 814. Using the monitoring console 816, the user can configure and monitor an index cluster, and see information such as disk usage by an index, volume usage by an indexer, index and volume size over time, data age, statistics for bucket types, and bucket settings, among other information.

Figure 9:
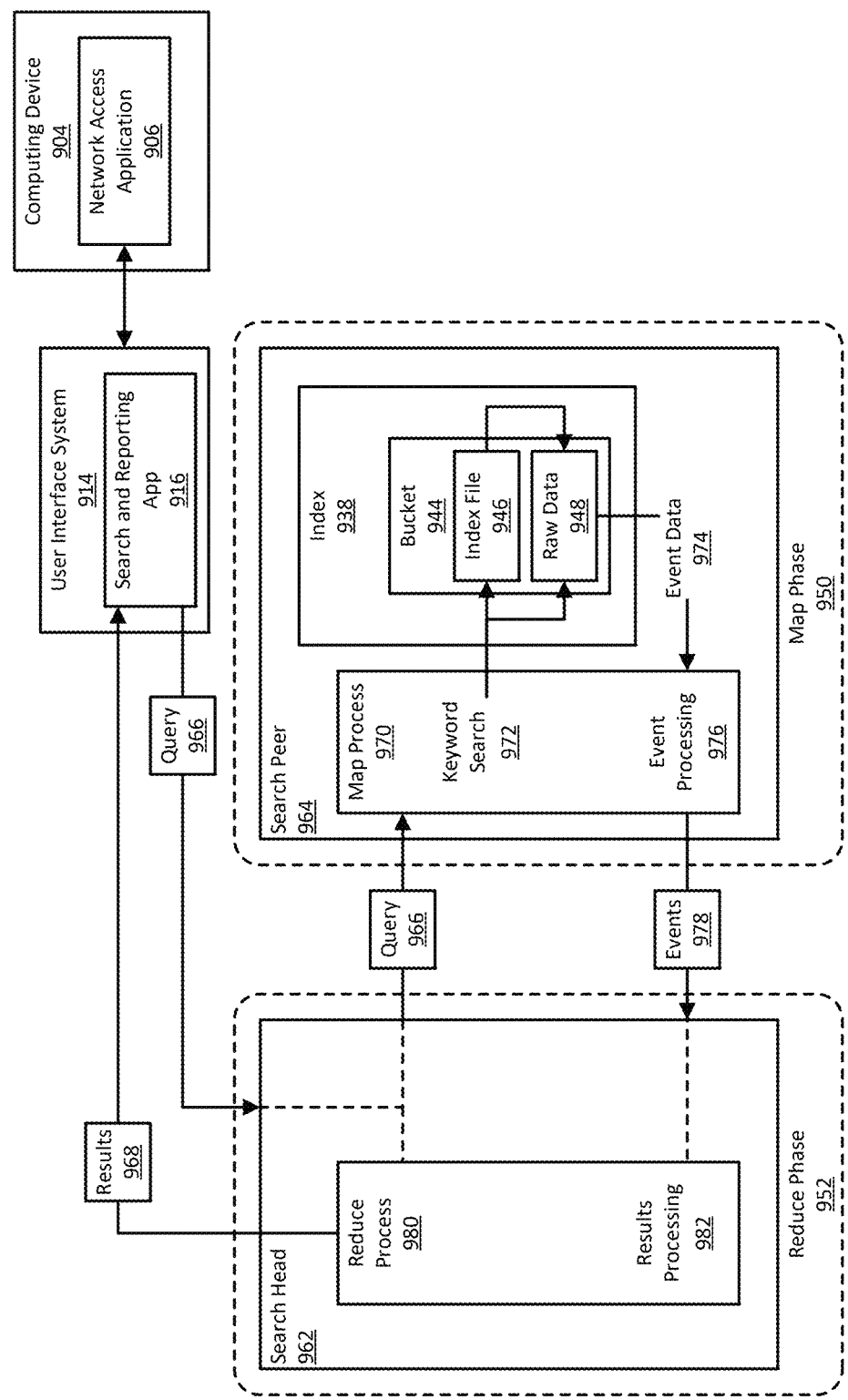
FIG. 9 is a block diagram illustrating an example of a search system of a data intake and query system.

FIG. 9 is a block diagram illustrating in greater detail an example of the search system 960 of a data intake and query system, such as the data intake and query system 710 of FIG. 7. The search system 960 of FIG. 9 issues a query 966 to a search head 962, which sends the query 966 to a search peer 964. Using a map process 970, the search peer 964 searches the appropriate index 938 for events identified by the query 966 and sends events 978 so identified back to the search head 962. Using a reduce process 982, the search head 962 processes the events 978 and produces results 968 to respond to the query 966. The results 968 can provide useful insights about the data stored in the index 938. These insights can aid in the administration of information technology systems, in security analysis of information technology systems, and/or in analysis of the development environment provided by information technology systems.

The query 966 that initiates a search is produced by a search and reporting app 916 that is available through the user interface system 914 of the data intake and query system. Using a network access application 906 executing on a computing device 904, a user can input the query 966 into a search field provided by the search and reporting app

916. Alternatively or additionally, the search and reporting app 916 can include pre-configured queries or stored queries that can be activated by the user. In some cases, the search and reporting app 916 initiates the query 966 when the user enters the query 966. In these cases, the query 966 maybe referred to as an "ad-hoc" query. In some cases, the search and reporting app 916 initiates the query 966 based on a schedule. For example, the search and reporting app 916 can be configured to execute the query 966 once per hour, once per day, at a specific time, on a specific date, or at some other time that can be specified by a date, time, and/or frequency. These types of queries maybe referred to as scheduled queries.

The query 966 is specified using a search processing language. The search processing language includes commands or search terms that the search peer 964 will use to identify events to return in the search results 968. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 966 to include sequential commands, where a subsequent command may operate on the results of a prior command. As an example, sequential commands may be separated in the query 966 by a vertical line ("|" or "pipe") symbol.

In addition to one or more search commands, the query 966 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 966 occurs in two broad phases: a map phase 950 and a reduce phase 952. The map phase 950 takes place across one or more search peers. In the map phase 950, the search peers locate event data that matches the search terms in the search query 966 and sorts the event data into field-value pairs. When the map phase 950 is complete, the search peers send events that they have found to one or more search heads for the reduce phase 952. During the reduce phase 952, the search heads process the events through commands in the search query 966 and aggregate the events to produce the final search results 968.

A search head, such as the search head 962 illustrated in FIG. 9, is a component of the search system 960 that manages searches. The search head 962, which may also be referred to herein as a search management component, can be implemented using program code that can be executed on a computing device. The program code for the search head 962 can be stored on a non-transitory computer-readable medium and from this medium can be loaded or copied to the memory of a computing device. One or more hardware processors of the computing device can read the program code from the memory and execute the program code in order to implement the operations of the search head 962.

Upon receiving the search query 966, the search head 962 directs the query 966 to one or more search peers, such as the search peer 964 illustrated in FIG. 9. "Search peer" is an alternate name for "indexer" and a search peer may be largely similar to the indexer described previously. The search peer 964 may be referred to as a "peer node" when the search peer 964 is part of an indexer cluster. The search peer 964, which may also be referred to as a search execution component, can be implemented using program code that can be executed on a computing device. In some implementations, one set of program code implements both the search head 962 and the search peer 964 such that the search head 962 and the search peer 964 form one component. In some implementations, the search head 962 is an independent piece of code that performs searching and no indexing functionality. In these implementations, the search head 962 may be referred to as a dedicated search head.

The search head 962 may consider multiple criteria when determining whether to send the query 966 to the particular search peer 964. For example, the search system 960 may be configured to include multiple search peers that each have duplicative copies of at least some of the event data and are implanted using different hardware resources q. In this example, the sending the search query 966 to more than one search peer allows the search system 960 to distribute the search workload across different hardware resources. As another example, search system 960 may include different search peers for different purposes (e.g., one has an index storing a first type of data or from a first data source while a second has an index storing a second type of data or from a second data source). In this example, the search query 966 may specify which indexes to search, and the search head 962 will send the query 966 to the search peers that have those indexes.

To identify events 978 to send back to the search head 962, the search peer 964 performs a map process 970 to obtain event data 974 from the index 938 that is maintained by the search peer 964. During a first phase of the map process 970, the search peer 964 identifies buckets that have events that are described by the time indicator in the search query 966. As noted above, a bucket contains events whose timestamps fall within a particular range of time. For each bucket 944 whose events can be described by the time indicator, during a second phase of the map process 970, the search peer 964 performs a keyword search 972 using search terms specified in the search query 966. The search terms can be one or more of keywords, phrases, fields, Boolean expressions, and/or comparison expressions that in combination describe events being searched for. When segmentation is enabled at index time, the search peer 964 performs the keyword search 972 on the bucket's index file 946. As noted previously, the index file 946 includes a lexicon of the searchable terms in the events stored in the bucket's raw data 948 file. The keyword search 972 searches the lexicon for searchable terms that correspond to one or more of the search terms in the query 966. As also noted above, the lexicon incudes, for each searchable term, a reference to each location in the raw data 948 file where the searchable term can be found. Thus, when the keyword search identifies a searchable term in the index file 946 that matches a search term in the query 966, the search peer 964 can use the location references to extract from the raw data 948 file the event data 974 for each event that include the searchable term.

In cases where segmentation was disabled at index time, the search peer 964 performs the keyword search 972 directly on the raw data 948 file. To search the raw data 948, the search peer 964 may identify searchable segments in events in a similar manner as when the data was indexed. Thus, depending on how the search peer 964 is configured, the search peer 964 may look at event fields and/or parts of event fields to determine whether an event matches the query 966. Any matching events can be added to the event data 974 read from the raw data 948 file. The search peer 964 can further be configured to enable segmentation at search time, so that searching of the index 938 causes the search peer 964 to build a lexicon in the index file 946.

The event data 974 obtained from the raw data 948 file includes the full text of each event found by the keyword search 972. During a third phase of the map process 970, the search peer 964 performs event processing 976 on the event data 974, with the steps performed being determined by the configuration of the search peer 964 and/or commands in the search query 966. For example, the search peer 964 can be configured to perform field discovery and field extraction. Field discovery is a process by which the search peer 964 identifies and extracts key-value pairs from the events in the event data 974. The search peer 964 can, for example, be configured to automatically extract the first 100 fields (or another number of fields) in the event data 974 that can be identified as key-value pairs. As another example, the search peer 964 can extract any fields explicitly mentioned in the search query 966. The search peer 964 can, alternatively or additionally, be configured with particular field extractions to perform.

Other examples of steps that can be performed during event processing 976 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 964 sends processed events 978 to the search head 962, which performs a reduce process 980. The reduce process 980 potentially receives events from multiple search peers and performs various results processing 982 steps on the received events. The results processing 982 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 982 can further include applying commands from the search query 966 to the events. The query 966 can include, for example, commands for evaluating and/or manipulating fields (e.g., to generate new fields from existing fields or parse fields that have more than one value). As another example, the query 966 can include commands for calculating statistics over the events, such as counts of the occurrences of fields, or sums, averages, ranges, and so on, of field values. As another example, the query 966 can include commands for generating statistical values for purposes of generating charts of graphs of the events.

The reduce process 980 outputs the events found by the search query 966, as well as information about the events. The search head 962 transmits the events and the information about the events as search results 968, which are received by the search and reporting app 916. The search and reporting app 916 can generate visual interfaces for viewing the search results 968. The search and reporting app 916 can, for example, output visual interfaces for the network access application 906 running on a computing device 904 to generate.

The visual interfaces can include various visualizations of the search results 968, such as tables, line or area charts, Chloropleth maps, or single values. The search and reporting app 916 can organize the visualizations into a dashboard, where the dashboard includes a panel for each visualization. A dashboard can thus include, for example, a panel listing the raw event data for the events in the search results 968, a panel listing fields extracted at index time and/or found through field discovery along with statistics for those fields, and/or a timeline chart indicating how many events occurred at specific points in time (as indicated by the timestamps associated with each event). In various implementations, the search and reporting app 916 can provide one or more default dashboards. Alternatively or additionally, the search and reporting app 916 can include functionality that enables a user to configure custom dashboards.

The search and reporting app 916 can also enable further investigation into the events in the search results 968. The process of further investigation may be referred to as drilldown. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 966. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 10:
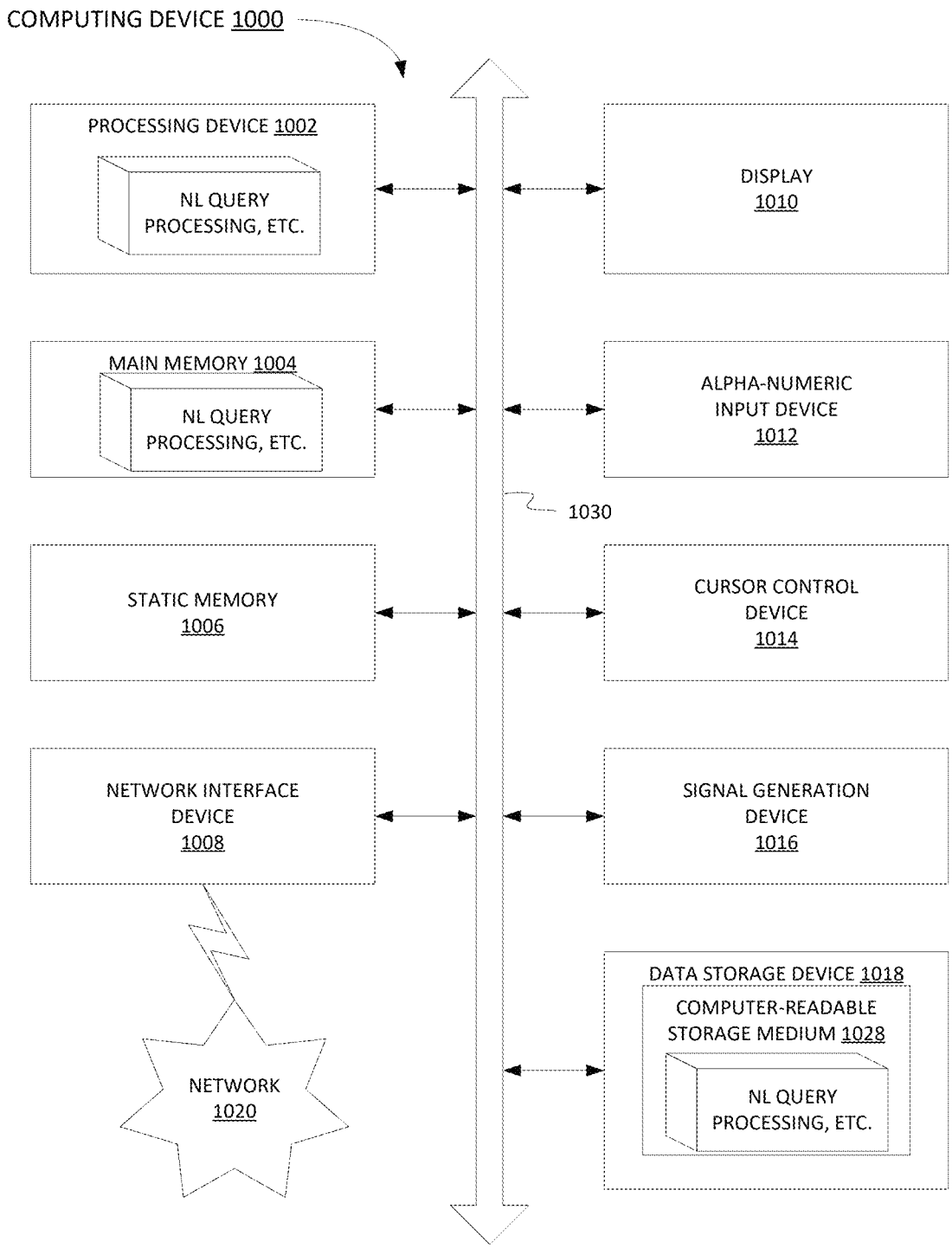
FIG. 10 is a block diagram of a computer system that can implement some or all of the techniques introduced herein.

FIG. 10 illustrates a diagrammatic representation of a computing device within which a set of instructions for causing the computing device to perform the methods discussed herein may be executed. The computing device 1000 may be connected to other computing devices in a LAN, an intranet, an extranet, and/or the Internet. The computing device 1000 may operate in the capacity of a server machine in client-server network environment. The computing device 1000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computing device 1000 may implement the above described methods for NL query processing.

The exemplary computing device 1000 may include a processing device (e.g., a general-purpose processor) 1002, a main memory 1004 (e.g., synchronous dynamic random-access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices, such as an application specific integrated circuit (ASIC), a field programmable gate array (FPGA), a digital signal processor (DSP), a network processor, or the like. The processing device 1002 may be configured to execute the methods described herein, in accordance with one or more aspects of the present disclosure.

The computing device 1000 may further include a network interface device 1008, which may communicate with a network 1019. The computing device 1000 also may include a display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the methods described herein, in accordance with one or more aspects of the present disclosure) implementing any one or more of the methods or functions described herein. Instructions implementing methods may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:
1. A computer-implemented method comprising:
 collecting, from a plurality of software tools used to develop a software program, data generated by the plurality of software tools during development of the software program, wherein the software program is developed in part by use of a first software tool of the plurality of software tools;

normalizing the collected data generated by the plurality of software tools to produce normalized data, wherein normalizing the collected data from the plurality of software tools includes mapping the collected data to fields of a common information model, wherein the fields of the common information model include a set of linking fields, the set of linking fields being fields to which data collected from at least two of the plurality of software tools are mapped, wherein the set of linking fields includes a hash field corresponding to a hash generated by one or more of the software tools;

storing the normalized data persistently in a storage facility beyond a usage period of the first software tool;

identifying, after the usage period of the first software tool, a security issue associated with the software program by analyzing the normalized data, wherein identifying the security issue includes computing a user risk score based on user activity represented in the data, and computing a system risk score based on system-generated events represented in the data, wherein the security issue is identified based on the user risk score and the system risk score; and determining whether a particular risk score associated with the security issue exceeds a risk threshold;

in response to the determining that the particular risk score associated with the security issue exceeds the risk threshold, triggering a tool that reverts a deployment of the software program; and causing display, in a graphical user interface, of an alert indicative of the security issue associated with the software program.

2. The computer-implemented method of claim 1, wherein the software program is further developed by use of a second software tool of the plurality of software tools, wherein at least a portion of a usage period of the second software tool occurs after the usage period of the first software tool, and wherein the security issue is identified during the usage period of the second software tool and after the usage period of the first software tool.

3. The computer-implemented method of claim 1, wherein the data generated by the plurality of software tools includes information relating to a commit, a review, or a release of code of the software program.

4. The computer-implemented method of claim 1, further comprising:

calculating a first base risk score of a first event associated with the first software tool and a second base risk score of a second event associated with a second software tool of the plurality of software tools; and generating a total risk score by combining the first base risk score adjusted by a first weight with the second base risk score adjusted by a second weight, wherein identifying the security issue comprises determining that the total risk score exceeds a threshold value.

5. The computer-implemented method of claim 1, further comprising:

collecting additional data generated by a second software tool used to develop the software program;

normalizing and persisting the additional data generated by the second software tool;

aggregating the additional data with the normalized data generated by the plurality of software tools to produce aggregated data; and updating an identification of the security issue of the software program based on the aggregated data.

6. The computer-implemented method of claim 1, further comprising: calculating a first risk score associated with the security issue, wherein the first risk score indicates a priority level associated with the security issue; collecting additional data generated by a second software tool used to develop the software program, wherein the second software tool is used after the usage period of the first software tool; normalizing and persisting the additional data generated by the second software tool; aggregating the additional data with the normalized data generated by the plurality of software tools to produce aggregated data; and calculating a second risk score associated with the security issue based on the aggregated data, wherein the second risk score indicates a different priority level associated with the security issue.

7. The computer-implemented method of claim 1, further comprising:

executing a search of the normalized data for a set of parameters, wherein the set of parameters is associated with at least two of the plurality of software tools;

based on identifying the set of parameters in the normalized data, identifying a notable event; and assessing a risk score associated with the notable event, wherein the security issue is identified based on a determination that the risk score exceeds a threshold value.

8. The computer-implemented method of claim 1, wherein the normalized data include first data and second data, the first data associated with an alert indicating a source code vulnerability or a dependency vulnerability, the second data associated with an audit log indicating user activity or a configuration change, and wherein the security issue is identified based on the first data and the second data.

9. A computing device comprising:

a processor; and a non-transitory computer-readable medium having stored thereon instructions, execution of which by the processor causes the computing device to perform operations including:

collecting, from a plurality of software tools used to develop a software program, data generated by the plurality of tools during development of the software program, wherein the software program is developed in part by use of a first software tool of the plurality of software tools;

normalizing the collected data generated by the plurality of software tools to produce normalized data, wherein normalizing the collected data from the plurality of software tools includes mapping the collected data to fields of a common information model, wherein the fields of the common information model include a set of linking fields, the set of linking fields being fields to which data collected from at least two of the plurality of software tools are mapped, wherein the set of linking fields includes a hash field corresponding to a hash generated by one or more of the software tools;

storing the normalized data persistently in a storage facility beyond a usage period of the first software tool;

identifying, after the usage period of the first software tool, a security issue associated with the software program by analyzing the normalized data, wherein identifying the security issue includes computing a user risk score based on user activity represented in the data, and computing a system risk score based on system-generated events represented in the data, wherein the security issue is identified based on the user risk score and the system risk score; and determining whether a particular risk score associated with the security issue exceeds a risk threshold;

in response to the determining that the particular risk score associated with the security issue exceeds the risk threshold, triggering a tool that reverts a deployment of the software program; and causing display, in a graphical user interface, of an alert indicative of the security issue associated with the software program.

10. The computing device of claim 9, wherein the software program is further developed by use of a second software tool of the plurality of software tools, wherein at least a portion of a usage period of the second software tool occurs after the usage period of the first software tool, and wherein the security issue is identified during the usage period of the second software tool and after the usage period of the first software tool.

11. The computing device of claim 9, wherein the normalized data include first data and second data, the first data associated with an alert indicating a source code vulnerability or a dependency vulnerability, the second data associated with an audit log indicating user activity or a configuration change, and wherein the security issue is identified based on the first data and the second data.

12. A non-transitory computer-readable medium having stored thereon instructions, execution of which by one or more processors in a computing system causes the computing system to perform operations comprising:

collecting, from a plurality of software tools used to develop a software program, data generated by the plurality of tools during development of the software program, wherein the software program is developed in part by use of a first software tool of the plurality of software tools;

normalizing the collected data generated by the plurality of software tools to produce normalized data, wherein normalizing the collected data from the plurality of software tools includes mapping the collected data to fields of a common information model, wherein the fields of the common information model include a set of linking fields, the set of linking fields being fields to which data collected from at least two of the plurality of software tools are mapped, wherein the set of linking fields includes a hash field corresponding to a hash generated by one or more of the software tools;

storing the normalized data persistently in a storage facility beyond a usage period of the first software tool;

identifying, after the usage period of the first software tool, a security issue associated with the software program by analyzing the normalized data, wherein identifying the security issue includes computing a user risk score based on user activity represented in the data, and computing a system risk score based on system-generated events represented in the data, wherein the security issue is identified based on the user risk score and the system risk score; and determining whether a particular risk score associated with the security issue exceeds a risk threshold;

in response to the determining that the particular risk score associated with the security issue exceeds the risk threshold, triggering a tool that reverts a deployment of the software program; and causing display, in a graphical user interface, of an alert indicative of the security issue associated with the software program.

13. The non-transitory computer-readable medium of claim 12, wherein the software program is further developed by use of a second software tool of the plurality of software tools, wherein at least a portion of a usage period of the second software tool occurs after the usage period of the first software tool, and wherein the security issue is identified during the usage period of the second software tool and after the usage period of the first software tool.

\* \* \* \* \*